United States Patent
Garrity

(10) Patent No.: US 8,526,205 B2
(45) Date of Patent: Sep. 3, 2013

(54) PHOTOVOLTAIC POWER CONDITIONING UNITS

(75) Inventor: Paul Garrity, Rockwall, TX (US)

(73) Assignee: Enecsys Limited, Cambridge (GB)

( * ) Notice: Subject to any disclaimer, the term of this patent is extended or adjusted under 35 U.S.C. 154(b) by 0 days.

(21) Appl. No.: 13/297,241

(22) Filed: Nov. 15, 2011

(65) Prior Publication Data

US 2012/0081933 A1    Apr. 5, 2012

(30) Foreign Application Priority Data

Nov. 1, 2011 (GB) .................................. 1118850.5

(51) Int. Cl.
*H02M 5/45* (2006.01)
*H02M 5/458* (2006.01)

(52) U.S. Cl.
USPC .......................................................... 363/37

(58) Field of Classification Search
USPC ............... 363/16, 37; 323/222–224
See application file for complete search history.

(56) References Cited

U.S. PATENT DOCUMENTS

| | | |
|---|---|---|
| 4,104,687 A | 8/1978 | Zulaski |
| 4,626,983 A | 12/1986 | Harada et al. |
| 5,576,941 A | 11/1996 | Nguyen et al. |
| 5,708,576 A | 1/1998 | Jones et al. |
| 6,281,485 B1 | 8/2001 | Siri |
| 6,339,538 B1 | 1/2002 | Handleman |
| 6,812,396 B2 | 11/2004 | Makita et al. |
| 7,031,176 B2 | 4/2006 | Kotsopoulos et al. |
| 7,248,946 B2 | 7/2007 | Bashaw et al. |
| 7,463,500 B2 | 12/2008 | West |
| 7,626,834 B2 | 12/2009 | Chisenga et al. |
| 7,701,736 B2 | 4/2010 | Yang et al. |
| 8,089,785 B2 | 1/2012 | Rodriguez et al. |
| 8,184,460 B2 | 5/2012 | O'Brien et al. |
| 2001/0023703 A1 | 9/2001 | Kondo et al. |
| 2003/0185026 A1 | 10/2003 | Matsuda et al. |
| 2005/0172995 A1 | 8/2005 | Rohrig et al. |
| 2007/0158185 A1 | 7/2007 | Andelman et al. |
| 2007/0164612 A1 | 7/2007 | Wendt et al. |

(Continued)

FOREIGN PATENT DOCUMENTS

| | | |
|---|---|---|
| EP | 0947905 | 10/1999 |
| EP | 1239576 | 9/2002 |

(Continued)

OTHER PUBLICATIONS

Meinhardt et al. May 2001, Solar Energy, vol. 69, pp. 217-227.*

(Continued)

*Primary Examiner* — Jue Zhang
(74) *Attorney, Agent, or Firm* — Adeli & Tollen LLP

(57) ABSTRACT

We describe a photovoltaic (PV) panel power conditioning circuits, in particular for a PV panel with multiple sub-strings of connected solar cells. The power conditioning unit comprises a set of input power converters, one connected to each sub-string, a shared dc link to provide a common dc bus for the set of input power converters, and a common output power conversion stage coupled to the shared dc link to convert power from the shared dc link to ac power for a mains power supply output from the power conditioning unit. Local conversion of the sub-strings facilitates control of the power available from the panel and optimum energy harvesting, as well as local maximum power point tracking (MPPT) adjustment.

17 Claims, 34 Drawing Sheets

(56) References Cited

U.S. PATENT DOCUMENTS

| | | | |
|---|---|---|---|
| 2008/0055941 | A1 | 3/2008 | Victor et al. |
| 2008/0164766 | A1 | 7/2008 | Adest et al. |
| 2008/0266919 | A1 | 10/2008 | Mallwitz |
| 2009/0020151 | A1 | 1/2009 | Fornage |
| 2009/0021877 | A1 | 1/2009 | Fornage et al. |
| 2009/0080226 | A1 | 3/2009 | Fornage |
| 2010/0002470 | A1* | 1/2010 | Kiamilev et al. ............... 363/16 |
| 2010/0157632 | A1 | 6/2010 | Batten et al. |
| 2010/0207455 | A1 | 8/2010 | Erickson, Jr. et al. |
| 2010/0289337 | A1* | 11/2010 | Stauth et al. .................... 307/77 |
| 2010/0309692 | A1 | 12/2010 | Chisenga et al. |
| 2010/0309695 | A1 | 12/2010 | Fornage |
| 2011/0031816 | A1 | 2/2011 | Buthker et al. |
| 2011/0187198 | A1 | 8/2011 | Williams et al. |
| 2011/0273015 | A1 | 11/2011 | Adest et al. |
| 2012/0033463 | A1 | 2/2012 | Rodriguez et al. |
| 2012/0039099 | A1 | 2/2012 | Rodriguez et al. |
| 2012/0063177 | A1 | 3/2012 | Garrity |
| 2012/0081934 | A1 | 4/2012 | Garrity et al. |
| 2012/0081937 | A1 | 4/2012 | Phadke |

FOREIGN PATENT DOCUMENTS

| | | |
|---|---|---|
| EP | 1974453 | 10/2008 |
| EP | 2249457 | 11/2010 |
| EP | 2286645 | 2/2011 |
| GB | 2415841 | 1/2006 |
| GB | 2434490 | 7/2007 |
| GB | 2454389 | 5/2009 |
| GB | 2478789 | 9/2011 |
| GB | 1118850 | 11/2011 |
| GB | 1118851 | 11/2011 |
| GB | 2486509 | 6/2012 |
| GB | 1211883 | 7/2012 |
| JP | 8-317664 | 11/1996 |
| JP | 2000-020150 | 1/2000 |
| JP | 2000-347753 | 12/2000 |
| JP | 2001-178145 | 6/2001 |
| JP | 2006-041440 | 2/2006 |
| WO | WO 2004/006342 | 1/2004 |
| WO | WO 2005/076444 | 8/2005 |
| WO | WO 2007/080429 | 7/2007 |
| WO | WO 2008/112080 | 9/2008 |
| WO | WO 2009/051853 | 4/2009 |
| WO | WO 2010/037393 | 4/2010 |
| WO | WO 2010/062410 | 6/2010 |
| WO | WO 2010/144637 | 12/2010 |

OTHER PUBLICATIONS

Shimizu et al., Generation Control Circuit for Photovoltaic Modules, May 2001, IEEE, Trans. Power Electronics vol. 16, 293-300.*

Portions of prosecution history of U.S. Appl. No. 13/244,161, Mailing Date Oct. 15, 2012, Garrity, Paul.
Portions of prosecution history of U.S. Appl. No. 13/297,247, Mailing Date Oct. 19, 2012, Garrity, Paul, et al.
Portions of prosecution history of U.S. Appl. No. 12/160,743, Mailing Date Sep. 14, 2011, Rodriguez, Cuauhtemoc, et al.
Portions of prosecution history of U.S. Appl. No. 13/276,849, Mailing Date Oct. 10, 2012, Rodriguez, Cuauhtemoc, et al.
Portions of prosecution history of U.S. Appl. No. 13/276,885, Mailing Date Oct. 17, 2012, Rodriguez, Cuauhtemoc, et al.
Portions of prosecution history of U.S. Appl. No. 12/789,154, Mailing Date Jul. 27, 2012, Chisenga, Lesley, et al.
Portions of prosecution history of GB 0600658, Feb. 5, 2009 (mailing date), Enecsys Limited.
Portions of prosecution history of GB 0901815, Feb. 24, 2009 (mailing date), Enecsys Limited.
Portions of prosecution history of GB 1004621, Jan. 24, 2012 (mailing date), Enecsys Limited.
Portions of prosecution history of GB 1104800, Jul. 2, 2012 (mailing date), Enecsys Limited.
Portions of prosecution history of GB 1211883, Sep. 28, 2012 (mailing date), Enecsys Limited.
Portions of prosecution history of GB 1118850, Feb. 22, 2012 (mailing date), Enecsys Limited.
Portions of prosecution history of GB 1118851, Mar. 5, 2012 (mailing date), Enecsys Limited.
International Search Report of PCT/GB2007/050014, Jan. 23, 2008 (mailing date), Enecsys Limited.
International Preliminary Report on Patentability of PCT/GB2007/050014, Jul. 15, 2008 (issuance date), Enecsys Limited.
Author Unknown, "DC Combiner Box Enables Better Awareness for Active Management," SolarMagic DC Monitoring Combiner Box Specifications, Apr. 2011, 2 pages, National Semiconductor Corporation.
Author Unknown, "SolarMagic power optimizer; Integrated Smart Panel Chipset Maximizes PV System Efficiency at the Lowest Cost per kWh," SM3320-1A1 Power Optimizer Specifications, Sep. 2010, 2 pages, National Semiconductor Corporation.
Xiaofeng, Sun, et al., "A Research on Photovoltaic Energy Controlling System with Maximum Power Point Tracking," Proceedings of the Power Conversion Conference—Osaka, Apr. 2-5, 2002, pp. 822-826, vol. 2, IEEE.
Partial International Search Report of PCT/GB2012/052720, Feb. 14, 2013, mailing date, Enecsys Limited.
International Search Report and Written Opinion of PCT/GB2012/052720, Apr. 19, 2013, mailing date, Enecsys Limited.

* cited by examiner

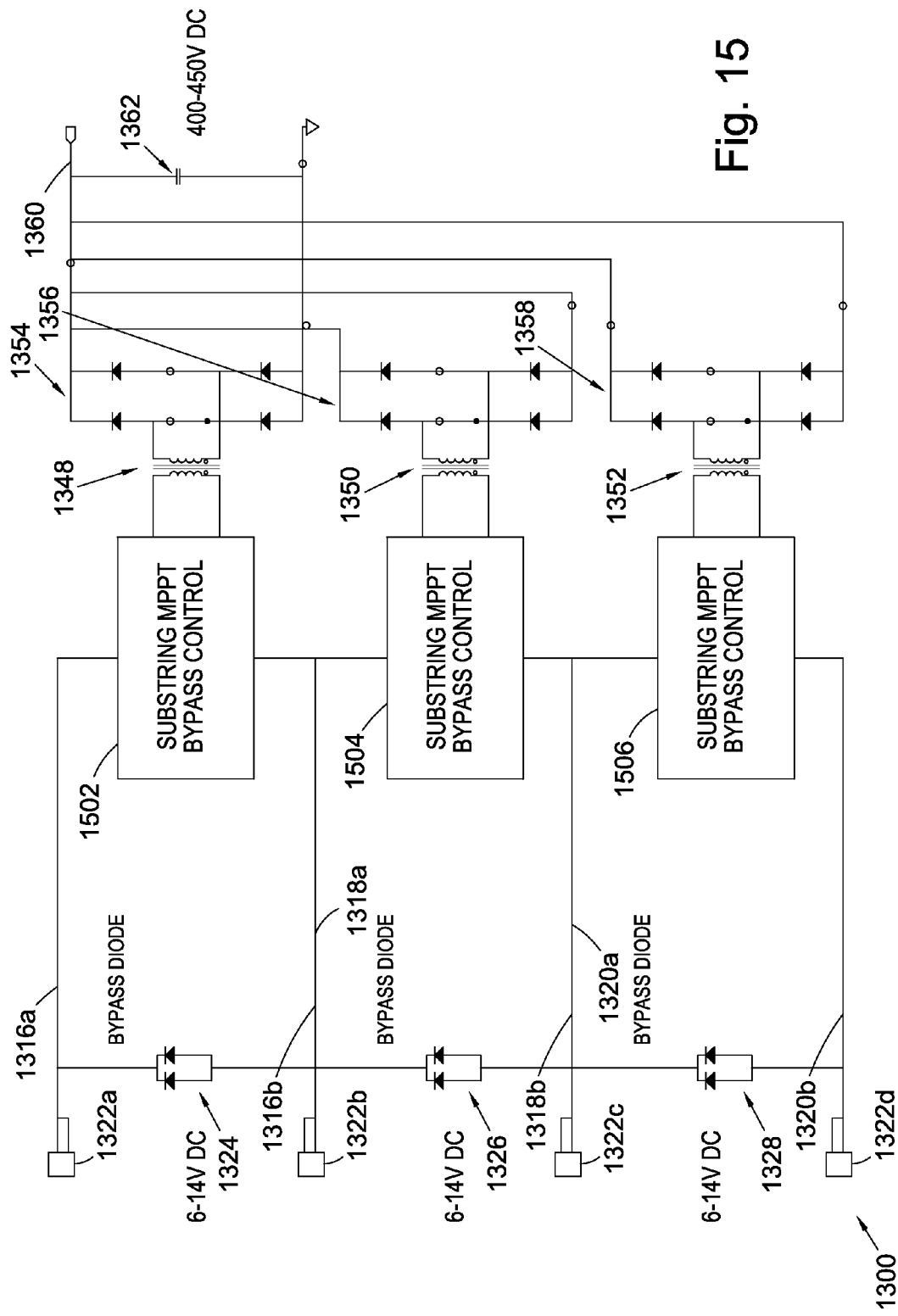

PHOTOVOLTAIC POWER CONDITIONING UNITS

CLAIM OF BENEFIT TO PRIOR APPLICATIONS

This application claims priority to an earlier-filed United Kingdom Patent Application 1118850.5, filed Nov. 1, 2011, which is incorporated herein by reference.

FIELD OF THE INVENTION

This invention relates to system architectures, circuits and techniques for photovoltaic (PV) power conditioning units. Embodiments of the invention are particularly useful for addressing problems associated with partial shading of a PV panel.

BACKGROUND TO THE INVENTION

In a photovoltaic module (panel) the panel is made up of series-connected mono crystalline or polycrystalline solar cells, each having a forward voltage of around 0.6V, that is a forward diode drop. These are then series connected to form sub-strings, nominally of around 10V for a 60 cell module, and 12V for a 72 cell module. Under certain circumstances the solar PV modules can become partly shaded, for example from fallen leafs or from part of a building and no longer generate current or voltage. It is desirable to be able to improve the power harvest from a PV panel under such circumstances, in particular whilst protecting the PV panel from damage.

Background prior art can be found in: WO2010/144637; U.S. Pat. No. 7,031,176; JP2006-041440; EP2286645A; and US 2009/0080226.

SUMMARY OF THE INVENTION

According to the present invention there is therefore provided a photovoltaic (PV) power conditioning unit for delivering power from a PV panel to an ac power supply output, the PV panel comprising a string of series-connected solar cells with a least one electrical tap connection on said string to define a set of series-connected sub-strings of said solar cells, the power conditioning unit comprising: a set of input power converters, one for each said sub-string, each having a pair of dc input connections for connection to either end of a said sub-string, each of said input power converters having a power output; a shared dc link to provide a common dc bus for said set of input power converters, wherein said power output of each said input power converter is coupled to said shared dc link to provide power from a said sub-string to said dc bus; an energy storage capacitor, coupled to said shared dc link, to store power from said PV panel for delivering to said ac power supply output; and a common output power conversion stage coupled to said shared dc link to convert dc power from said shared dc link to ac power to provide an ac output from said power conditioning unit.

The above described system architecture enables a number of advantages including active bypassing to protect cells of a sub-string, and improved MPPT (maximum power point control) to facilitate optimum energy harvesting from the PV panel.

The power conditioning unit may be provided in a separate module connected to the PV panel or, as described later, it may be integrated with the panel itself.

In embodiments of the architecture an input power converter is a voltage-increasing dc-to-dc power converter comprising a dc-to-ac converter coupled to a transformer coupled, in turn, to an ac-to-dc conversion stage or full wave rectifier. In some embodiments the dc outputs of the input power converters are connected together to the shared dc link. In other embodiments the ac outputs of the transformers are connected together to provide a shared ac output which is then rectified to provide power to the dc link. In this latter case the dc-to-ac converters of the input power converters are synchronised so that the ac outputs are also synchronised. Alternatively the transformers of the input power converters may be shared so that each dc-to-ac converter drives a winding of a shared power coupling transformer having a common output winding coupled to a rectification stage and then to the dc link. The dc-to-ac power converter may comprise a resonant switching power converter, for example an LLC resonant converter with zero voltage switching, but this is not essential and other techniques such as direct duty cycle control may also be employed.

A shaded cell of a PV panel becomes a load and power generated in other solar cells of the panel may be dissipated in the shaded cell, creating a local hotspot and resulting in long term degradation and premature failure of the panel. This can be addressed by providing diodes to bypass the shaded cells, but this also had disadvantages because there is a relatively significant forward conduction voltage loss (of order 1 volt) and power dissipation which can require heat sinking. Diode failures can also occur.

In embodiments of the above described invention, therefore, the sub-strings lack bypass diodes and the power conditioning unit includes one or more sensors to sense a voltage and/or current on a sub-string to detect shading of the sub-string, and one or more bypass controllers (a bypass controller may be shared between sub-strings) which, in response to detection of sub-string shading, controls the input power converter connected to that sub-string to reduce or substantially stop power conversion from the sub-string. In embodiments where the input power converter comprises a dc-to-ac converter comprising a set of switches, for example MOSFETs, connected across the dc input of the power converter (for example, in a half-bridge type arrangement), the bypass controller controls these switches on to provide a bypass current path for the shaded sub-string. In some preferred embodiments the bypass controller function is combined with a controller performing MPPT on a sub-string as described further below. Optionally the PV module may be provided with a temperature sensor for the panel on each sub-string, and a bypass controller may then be configured to reduce rather than stop power conversion from a shaded sub-string so that the shaded sub-string can continue to produce power provided that it does not become hotter than some pre-determined threshold temperature value.

The input power converters may have outputs connected to the dc bus either in parallel or in series. When the outputs are connected in series the effective shading of a sub-string is to reduce the voltage on the dc bus and thus in the circumstances the bypass controller (or another controller of the power conditioning unit) may control the remaining, unshaded input converters to increase that output voltage to compensate. This may be achieved, for example, by changing the operating frequency of a resonant converter such as an LLC converter to pull the converter off resonance and increase the voltage gain by a factor of 50% (this otherwise being determined by the terms ratio of the transformer). Alternatively a similar result may be achieved by direct duty cycle control of a hard switching converter. In this way the system can continue to operate efficiently even where one sub-string is shaded.

In some embodiments of the power conditioning unit the dc-to-ac converters of the input power converters are synchronised to operate in an interleaved manner, each operating at a relative phase offset of 180°/n or 360°/n, where n is the number of input power converters. Thus, for example, three input converters may operate at 60° or 120° out of phase with respect to one another. This can substantially reduce ripple on the dc link, for example by a factor of approximately 6, for three input power converters.

Optionally a or each input power converter may comprise two switching power converters with their inputs connected in parallel (to a sub-string) and their outputs connected in parallel at the dc link. Then each converter may be designed to operate at less than the maximum design load and the converters separately enabled or disabled to operate either and/or both according to the power transferred to the output. Thus one or other or both of the parallel-connected input converters may be operated depending upon the power transferred by the parallel-connected converters, to thereby shape the efficiency curve of the combined system. To achieve this, the system may incorporate one or more power level controllers to selectively enable operation of the parallel-connected power converters; this controller may be incorporated into an MPPT controller for a sub-string. Optionally the power level controller may be configured to switch between the paralleled power converter stages using a soft-switching technique to gradually enable/disable a converter, for example by frequency modulation and/or duty cycle modulation of the dc-to-ac stages of the power converters. Such techniques are described in more detail in our co-pending UK patent application No: GB1104800.6 filed on 22 Mar. 2011, the contents of which are hereby incorporated by reference in their entirety.

In some preferred implementations the power conditioning unit includes a maximum power point tracking (MPPT) control system. Preferably this is employed to control the common output power conversion stage to, in effect, control the power drawn from preceding stages, for example as described in our GB2,478,789, hereby incorporated by reference in its entirety. However some preferred embodiments of the power conditioning unit additionally include a set of secondary MPPT control loops, one for each sub-string, operating on the respective input power converters, to improve MPPT performance under partial shading of a PV panel. Optionally the MPPT controller for an input converter/sub-string may also be configured to identify partial shading of a sub-string. This may be performed simply by monitoring current and/or voltage output from the sub-string or, in a more sophisticated approach, the shape of an I-V curve of a sub-string may be employed to identify shading of the sub-string. Thus whilst an unshaded sub-string may have an I-V curve which is convex with a single maximum, a shaded sub-string can depart from this curve shape, for example exhibiting one or more concave features or indentations which can lead to multiple local I-V maxima on the curve.

In embodiments the MPPT control system for the output power conversion stage has a sense input coupled to the dc link to sense a value of a sinusoidal voltage component at twice a frequency of the ac mains on this dc link, and is configured to control power injected into the ac mains supply from the output power conversion stage in response to a level of this sinusoidal voltage component. More particularly the output stage MPPT loop may be configured to control an amplitude of ac current provided to the ac mains power supply such that an amount of power transferred to the ac output is dependent on, more partially proportional to, an amplitude of the sinusoidal voltage component on the energy storage capacitor.

More generally in embodiments the implementation of the control functions of the power conditioning unit may be performed by multiple separate signal processors or by a separate processor per sub-string, or by one or more shared signal processors. Such a signal processor may be implemented in hardware, for example on an ASIC (applications specific integrated circuit) or in software, for example in combination with a DSP (digital signal processor) or firmware stored in non-volatile or read-only memory, or the control functions may be implemented in a combination of hard ware and software/firmware, optionally distributed between a plurality of coupled components in communication with one another.

Sub-string sensing for local, sub-string MPPT control raises some particular problems, in part because the sub-strings are, in effect, floating rather than ground-referenced, and in part because the sensed signals may need amplification.

Thus in a related aspect the invention provides a photovoltaic (PV) power conditioning unit for delivering power from a PV panel to an ac power supply output, the PV panel comprising a string of series-connected solar cells with a least one electrical tap connection on said string to define a set of series-connected sub-strings of said solar cells, the power conditioning unit comprising: a sensing circuit to sense a voltage or current from one or more of said solar cells wherein said sensing circuit comprises: a sense input to receive a voltage signal from said one or more solar cells dependent on said sensed voltage or current; and a voltage-programmed current source having a current programming input coupled to said sense input, and having a programmed current output to output a programmed current dependent on a level of said voltage signal, and wherein said programmed current output is coupled to a current-to-voltage converter to convert said programmed current to a voltage output from the sensing circuit dependent on said programmed current.

The voltage input to the sub-string sensing system may either be a voltage produced by the sub-string or a voltage across a current-sensing resistor to sense a current produced by the sub-string. In embodiments this sensing system facilitates sensing a 'floating' voltage as well as facilitating the amplification of small signals without the use of operational amplifiers and the like. The sensed voltage and/or current from a sub-string may be employed for controlling the power conditioning unit, for example for an MPPT control loop and/or a bypass function.

In some preferred embodiments the voltage input of the sensing circuit is provided to a full-wave rectification circuit such as a bridge rectifier to provide a by-polar (polarity-insensitive) input prior to driving the voltage-programmed constant current generator (which may be either a current source or a current sink). Preferably the programmable current generator provides an input to a current mirror which has one or more, optionally amplified, current outputs to provide an output current proportional to the voltage (or current) of the sensed sub-string. The output current may then be provided to the current-to-voltage converter, which may in embodiments simply comprise a resistor.

As previously described, embodiments of the above described architecture provide multiple input power converters, one for each sub-string of a PV panel. Also, optionally, each of these input power converters may comprise a set of parallel-connected inverters in an 'interleaved' configuration in which either or both may be selected for operation according to the power transferred, to shape the efficiency curve of a combined system. In our related patent application GB1104800.6 (ibid) we also describe techniques in which, independently of whether or not a sub-string power conversion is employed, multiple front end converter stages are connected in parallel and separately enabled/disable according to the power transferred.

The inventors have recognised that these system architectures may be combined into a flexible architecture which may be configured for either sub-string power conversion or switched front end power conversion.

Thus in a related aspect the invention provides a multipurpose photovoltaic power conditioning unit circuit board, for delivering power from a PV panel to an ac power supply output, the PV panel comprising a string of series-connected solar cells with a least one electrical tap connection on said string to define a set of series-connected sub-strings of said solar cells, the circuit board comprising: a set of input power converters, one for each said sub-string, each having a pair of dc input connections for connection to either end of a said sub-string, each of said input power converters having a power output; a shared dc link to provide a common dc bus for said set of input power converters, wherein said power output of each said input power converter is coupled to said shared dc link to provide power from a said sub-string to said dc bus; a common output power conversion stage coupled to said shared dc link to convert dc power from said shared dc link to ac power to provide an ac output from said power conditioning unit; and at least one controller for said power conditioning unit; wherein said at least one controller is configurable to control said power conditioning unit in a first sub-string converter mode in which each said input power converter receives power from a respective said sub-string, and in a second mode in which said set of input power converters is connected in parallel.

In embodiments in the first mode the controller is configured to provide MPPT and/or bypass functions for each sub-string of the PV panel. In the second mode the controller is configured to selectively enable operation of one or more of the input power converters dependent on the level of power drawn from the PV panel. The switching between these two configurations may be performed in hardware, for example by means of a link, software, or firmware, for example a configuration setting in EPROM. In embodiments, for flexibility, each input power converter has a pair of inputs and each pair of inputs in provided with a connection from the power conditioning unit circuit board. In this way the input power converters may be, for example, or connected in parallel to a single PV panel or each connected to a sub-string of a PV panel.

In a further related aspect the invention provides a photovoltaic power conditioning unit for extracting power from a PV panel and providing an ac output, the PV panel comprising a set of series-connected sub-strings of solar cells, the power conditioning unit comprising: at least one power converter to extract power from a said sub-string for said ac output; a sensing system to detect that a current source representing said sub-string is starting to reverse; and a current bypass system coupled to said sensing system to, responsive to said detection, bypass said sub-string in which said current source is starting to reverse.

Preferably the power conditioning unit comprises a set of the power converters each to provide power from a respective sub-string to the ac output, each having a respective sensing system and current bypass system. In embodiments the current bypass system comprises one or more semi-conductor switching devices connected across the input of a power converter that is across the sub-string to which the power converter is connected in use. Preferably each power converter/sub-string also is associated with an MPPT controller to maximise the power extracted from the respective sub-string.

In this way, broadly speaking, the photovoltaic power conditioning unit is configured to extract as much as possible of the power per sub-string to the point where the current source will reverse; and at this point the sub-string is bypassed to, effectively, re-circulate this energy. This approach provides much improved control over part of the panel behaviour.

In a related aspect the invention also provides a method of extracting power from a PV panel, the PV panel comprising a set of series-connected sub-strings of solar cells, the method comprising: extracting power from a said sub-string until detecting that a current source representing said sub-string begins to reverse; and bypassing said sub-string responsive to said detecting.

In a further related aspect the invention provides a photovoltaic (PV) power conditioning unit for delivering power from one or more PV panels to an ac power supply output, the power conditioning unit comprising: a set of input power converters, each having a pair of dc input connections and a power output; a shared dc link to provide a common dc bus for said set of input power converters, wherein said power output of each said input power converter is coupled to said shared dc link to provide power from said one or more PV panels to said dc bus; and a common output power conversion stage coupled to said shared dc link to convert dc power from said shared dc link to ac power to provide an output from said power conditioning unit.

BRIEF DESCRIPTION OF THE DRAWINGS

These and other aspects of the invention will now be further described, by way of example only, with reference to the accompanying figures, in which:

FIGS. 13a to 13c show, respectively, an example circuit implementation of the input power conversion stage of a power conditioning unit according to an embodiment of the invention, and first and second variants of the circuit architecture of FIG. 13a;

FIG. 15 shows a variant circuit architecture to the arrangements for FIG. 13 including sub-string MPPT and bypass control;

DETAILED DESCRIPTION OF PREFERRED EMBODIMENTS

Power Conditioning Units

Figure 1:
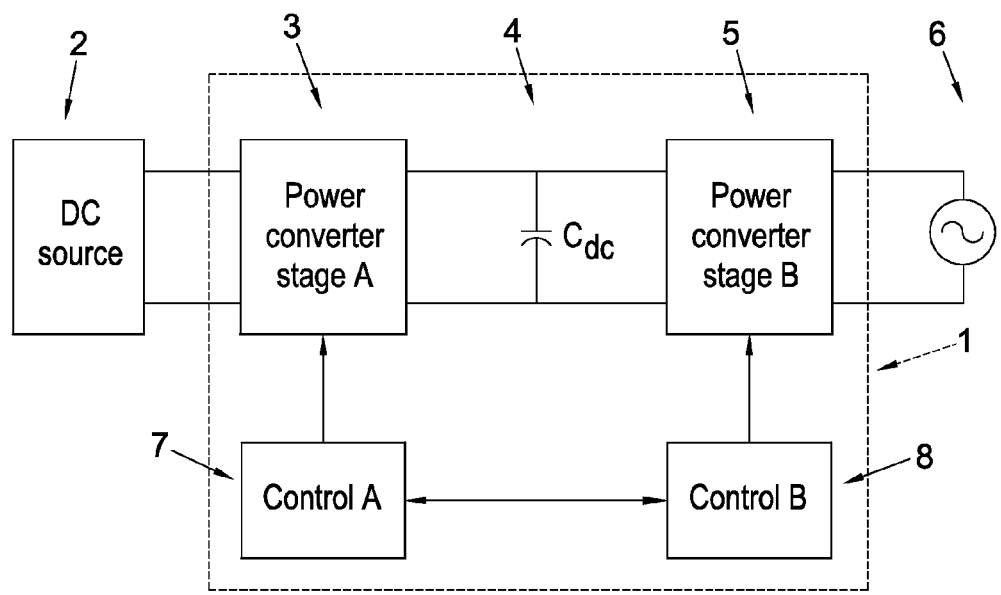
FIG. 1 shows an outline block diagram of an example power conditioning unit.

By way of background, we first describe an example photovoltaic power conditioning unit. Thus FIG. 1 shows photovoltaic power conditioning unit of the type we described in WO2007/080429. The power converter 1 is made of three major elements: a power converter stage A, 3, a reservoir (dc link) capacitor $C_{dc}$ 4, and a power converter stage B, 5. The apparatus has an input connected to a direct current (dc) power source 2, such as a solar or photovoltaic panel array (which may comprise one or more dc sources connected in series and/or in parallel). The apparatus also has an output to the grid main electricity supply 6 so that the energy extracted from the dc source is transferred into the supply. Capacitor $C_{dc}$ is preferably non-electrolytic, for example a film capacitor.

The power converter stage A may be, for example, a step-down converter, a step-up converter, or it may both amplify and attenuate the input voltage. In addition, it generally provides electrical isolation by means of a transformer or a coupled inductor. In general the electrical conditioning of the input voltage should be such that the voltage across the dc link capacitor $C_{dc}$ is always higher than the grid voltage. In general this block contains one or more transistors, inductors, and capacitors. The transistor(s) may be driven by a pulse width modulation (PWM) generator. The PWM signal(s) have variable duty cycle, that is, the ON time is variable with respect to the period of the signal. This variation of the duty cycle effectively controls the amount of power transferred across the power converter stage A.

The power converter stage B injects current into the electricity supply and the topology of this stage generally utilises some means to control the current flowing from the capacitor $C_{dc}$ into the mains. The circuit topology may be either a voltage source inverter or a current source inverter.

Figure 2A:
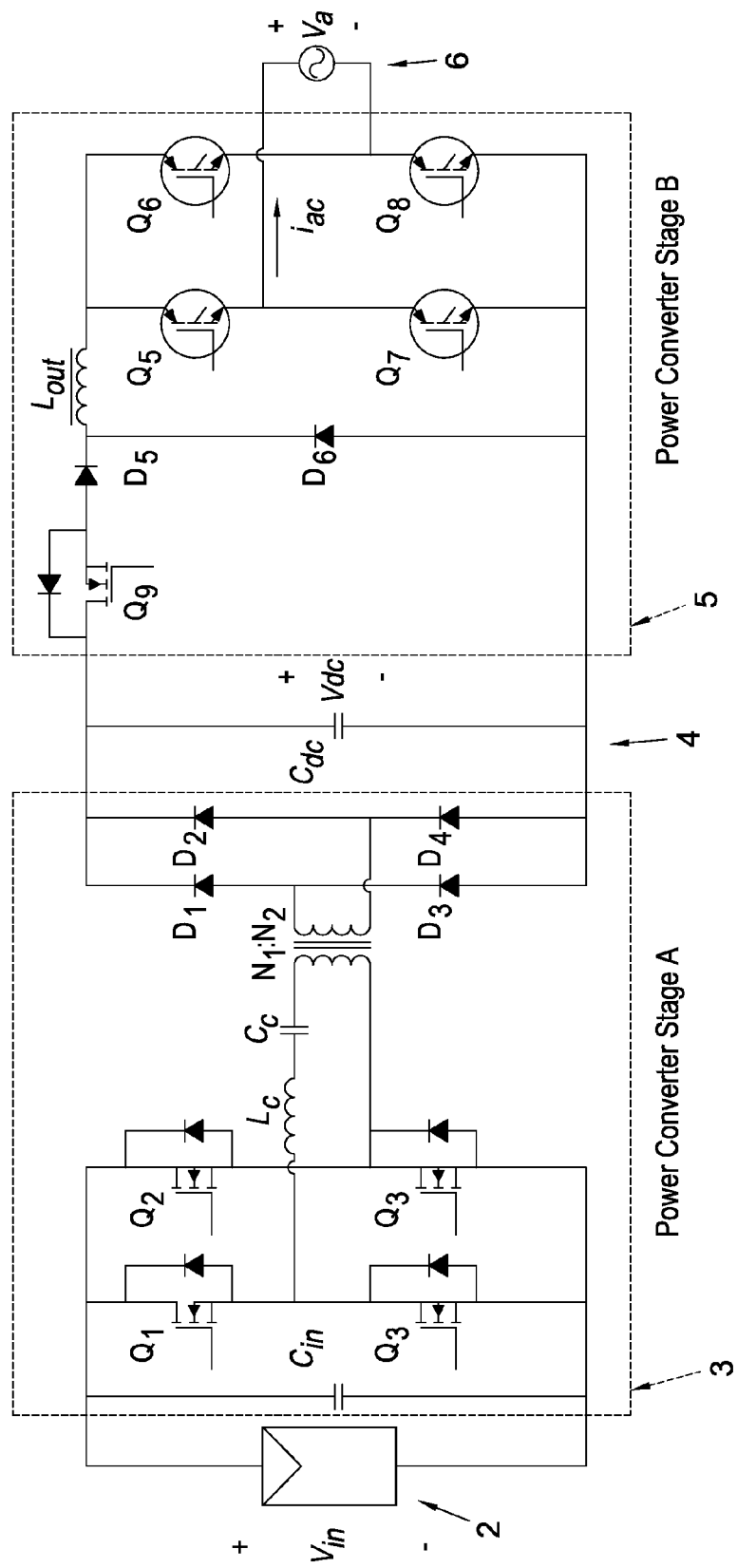
FIGS. 2a and 2b show details of a power conditioning unit of the type shown in FIG. 1.

FIG. 2 shows details of an example of a power conditioning unit of the type shown in FIG. 1; like elements are indicated by like reference numerals. In FIG. 2a Q1-Q4, D1-D4 and the transformer form a dc-to-dc conversion stage, here a voltage amplifier. In alternative arrangements only two transistors may be used; and/or a centre-tapped transformer with two back-to-back diodes may be used as the bridge circuit.

In the dc-to-ac converter stage, Q9, D5, D6 and Lout perform current shaping. In alternative arrangements this function may be located in a connection between the bridge circuit and the dc link capacitor: $D_6$ acts as a free-wheeling diode and $D_5$ prevents current form flowing back into the dc-link. When transistor $Q_9$ is switched on, a current builds up through $L_{out}$. When $Q_9$ is switched off, this current cannot return to zero immediately so $D_6$ provides an alternative path for current to flow from the negative supply rail ($D_5$ prevents a current flowing back into the dc-link via the body diode in $Q_9$ when $Q_9$ is switched off). Current injection into the grid is controlled using $Q_9$: when $Q_9$ is turned on the current flowing through $L_{out}$ increases and decreases when it is turned off (as long as the dc-link voltage is maintained higher than the grid voltage magnitude). Hence the current is forced to follow a rectified sinusoid which is in turn unfolded by the full-bridge output (transistors $Q_5$ to $Q_8$). Information from an output current sensor is used to feedback the instantaneous current value to a control circuit. The inductor current, $i_{out}$, is compared to a reference current, $i_{ref}$, to determine whether or not to switch on transistor $Q_9$. If the reference current is higher than $i_{out}$ then the transistor is turned on; it is switched off otherwise. The reference current, $i_{ref}$, may be generated from a rectified sinusoidal template in synchronism with the ac mains (grid) voltage.

Transistors Q5-Q8 constitutes an "unfolding" stage. Thus these transistors Q5-Q8 form a full-bridge that switches at line frequency using an analogue circuit synchronised with the grid voltage. Transistors Q5 and Q8 are on during the positive half cycle of the grid voltage and Q6 and Q7 are on during the negative half cycle of the grid voltage.

Thus in embodiments the power conditioning unit comprises a generic dc-ac-dc that provides voltage amplification of the source to above the grid voltage, and isolation, and a current source inverter (CSI) connected to the mains. The current injection is regulated using current shaping (current-control) in the inductor of the CSI via the intermediate buck-type stage. (This is described further in our GB2415841B, incorporated by reference).

Control (block) A of FIG. 1 may be connected to the control connections (e.g. gates or bases) of transistors in power converter stage A to control the transfer of power from the dc energy source. The input of this stage is connected to the dc energy source and the output of this stage is connected to the dc link capacitor. This capacitor stores energy from the dc energy source for delivery to the mains supply. Control (block) A may be configured to draw such that the unit draws substantially constant power from the dc energy source regardless of the dc link voltage $V_{dc}$ on $C_{dc}$.

Control (block) B may be connected to the control connections of transistors in the power converter stage B to control the transfer of power to the mains supply. The input of this stage is connected to the dc link capacitor and the output of this stage is connected to the mains supply. Control B may be configured to inject a substantially sinusoidal current into the mains supply regardless of the dc link voltage $V_{dc}$ on $C_{dc}$.

The capacitor $C_{dc}$ acts as an energy buffer from the input to the output. Energy is supplied into the capacitor via the power stage A at the same time that energy is extracted from the capacitor via the power stage B. The system provides a control method that balances the average energy transfer and allows a voltage fluctuation, resulting from the injection of ac power into the mains, superimposed onto the average dc voltage of the capacitor $C_{dc}$. The frequency of the oscillation can be either 100 Hz or 120 Hz depending on the line voltage frequency (50 Hz or 60 Hz respectively).

Figure 2B:
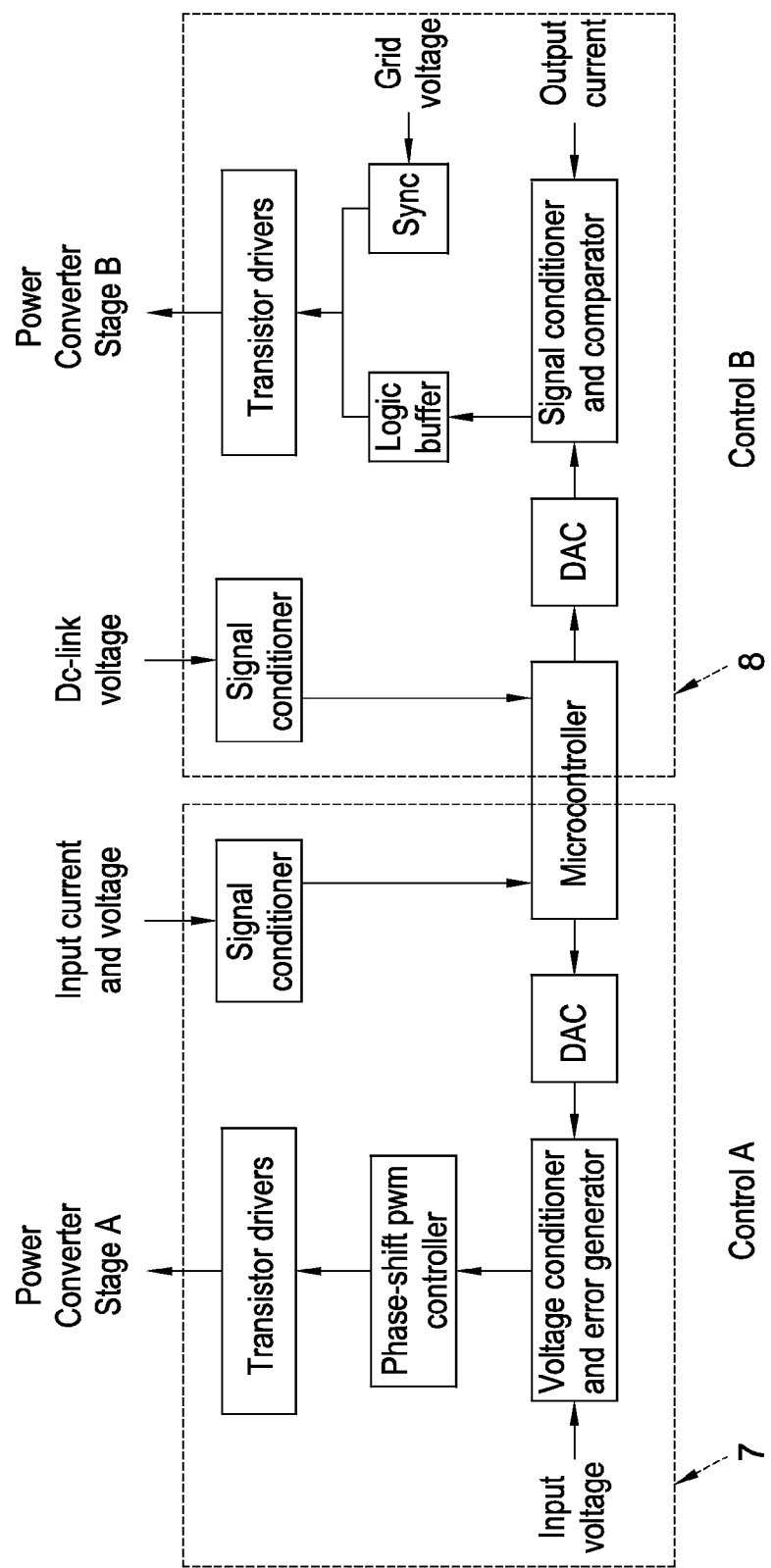

Two control blocks control the system: control block A controls the power stage A, and control block B power stage B. An example implementation of control blocks A and B is shown in FIG. 2b. In this example these blocks operate independently but share a common microcontroller for simplicity.

In broad terms, control block A senses the dc input voltage (and/or current) and provides a PWM waveform to control the transistors of power stage A to control the power transferred across this power stage. Control block B senses the output current (and voltage) and controls the transistors of power stage B to control the power transferred to the mains. Many different control strategies are possible. For example details of one preferred strategy reference may be made to our earlier filed WO2007/080429 (which senses the (ripple) voltage on the dc link)—but the embodiments of the invention we describe later do not rely on use of any particular control strategy.

In a photovoltaic power conditioning unit the microcontroller of FIG. 2b will generally implement an algorithm for some form of maximum power point tracking. In embodiments of the invention we describe later this or a similar microcontroller may be further configured to control whether one or both of the dc-to-dc power converter stages are operational, and to implement "soft" switching off of one of these stages when required. The microcontroller and/or associated hardware may also be configured to interleave the power transistor switching, preferable to reduce ripple as previously mentioned.

Figure 3A:
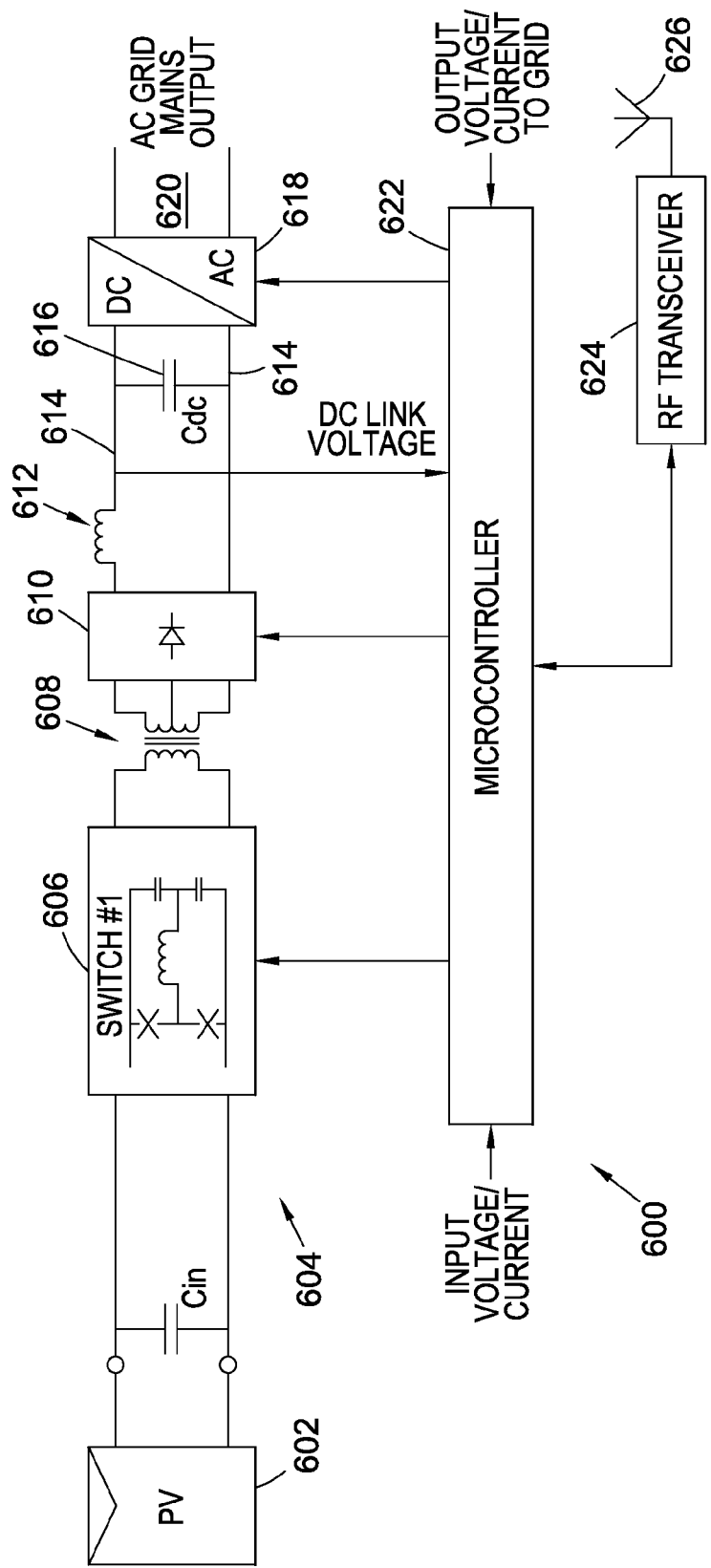
FIGS. 3a and 3b show details of a further example of solar photovoltaic inverter in which an input power converter incorporates an LLC resonant power converter.

Now referring to FIG. 3a, this shows a further example of a power conditioning unit 600. In the architecture of FIG. 3 a photovoltaic module 602 provides a dc power source for dc-to-dc power conversion stage 604, in this example each comprising an LLC resonant converter. Thus power conversion stage 604 comprises a dc-to-ac (switching) converter stage 606 to convert dc from module 602 to ac for a transformer 608. The secondary side of transformer 608 is coupled to a rectifying circuit 610, which in turn provides a dc output to a series-coupled output inductor 612. Output inductor 612 is coupled to a dc link 614 of the power conditioning unit, to which is also coupled a dc link capacitor 616. A dc-to-ac converter 618 has a dc input from a dc link and provides an ac output 620, for example to an ac grid mains supply.

A microcontroller 622 provides switching control signals to dc-to-ac converter 606, to rectifying circuit 610 (for synchronous rectifiers), and to dc-to-ac converter 618 in the output 'unfolding' stage. As illustrated microcontroller 622 also senses the output voltage/current to the grid, the input voltage/current from the PV module 602, and, in embodiments, the dc link voltage. (The skilled person will be aware of many ways in which such sensing may be performed). In some embodiments the microcontroller 622 implements a control strategy as previously described. As illustrated, the microcontroller 622 is coupled to an RF transceiver 624 such as a ZigBee™ transceiver, which is provided with an antenna 626 for monitoring and control of the power conditioning unit 600.

Figure 3B:
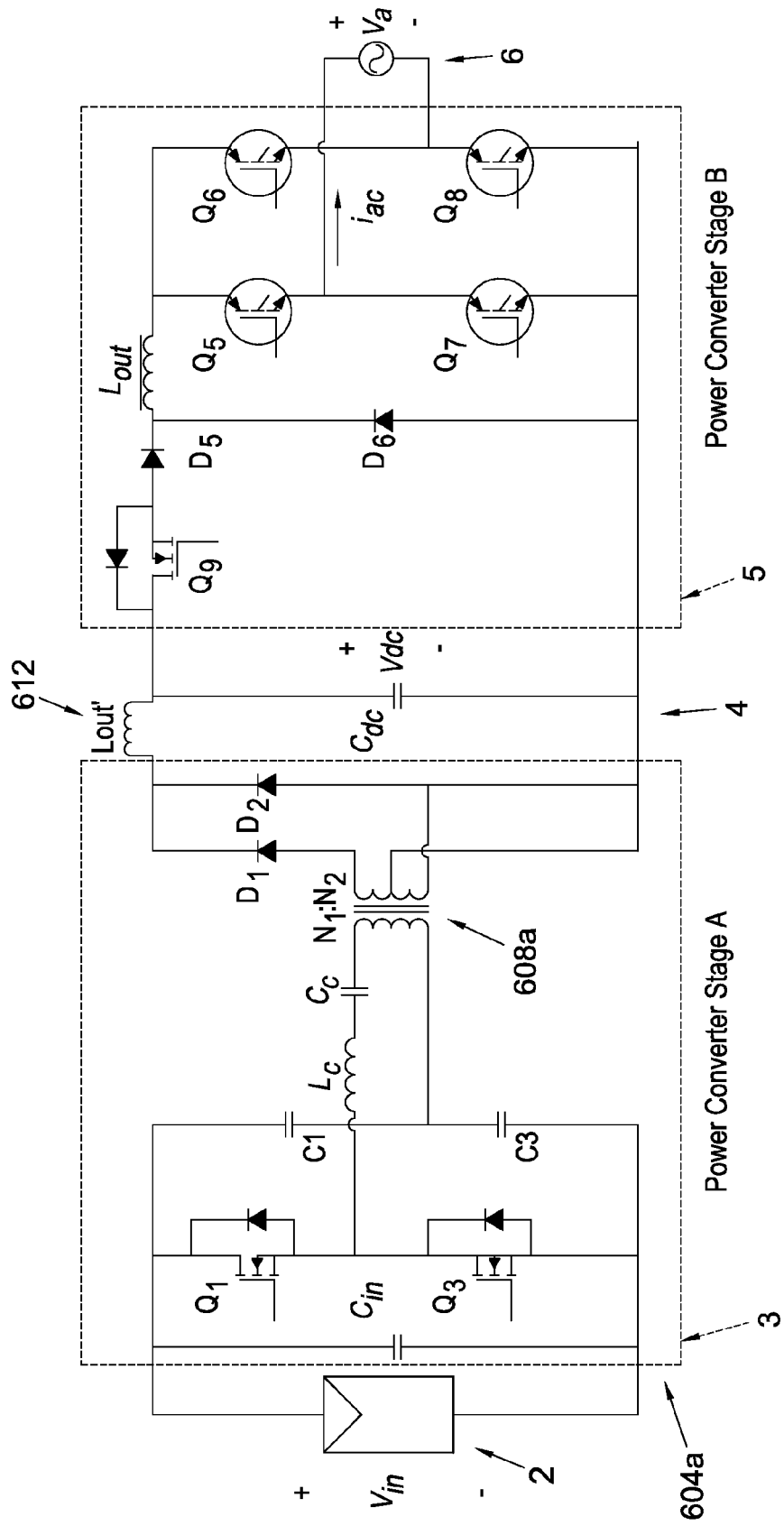

Referring now to FIG. 3b, this shows details of a portion of an example implementation of the arrangement of FIG. 3a. This example arrangement employs a modification of the circuit of FIG. 2a and like elements to those of FIG. 2a are indicated by like reference numerals; likewise like elements to those of FIG. 3a are indicated by like reference numerals. In the arrangement of FIG. 3b an LLC converter is employed (by contrast with FIG. 2a), using a pair of resonant capacitors C1, C3.

The circuits of FIGS. 1 to 3 are particularly useful for microinverters, for example having a maximum rate of power of less than 1000 Watts and or connected to a small number of PV modules, for example just one or two such modules. In such systems the panel voltages can be as low as 20 volts and hence the conversion currents can be in excess of 30 amps RMS.

Interleaved Topology

The output dc-to-ac converter stage may be implemented in any convenient manner. However embodiments of the photovoltaic power conditioning unit may employ multiple front end power converter stages connected in parallel between the dc input of the power conditioning unit and the dc link. In embodiments each of these power converter stages implements a boost/isolation stage using an LLC (resonant) conversion topology, with each with a transformer and an output inductance (which may be integrated with the transformer). This helps reduce a significant source of power losses (ac losses and $I^2R$ losses) in the initial boost/isolation stage, between the dc input and dc link of the power conditioning unit. Further details may be found in our co-pending patent application GB1104800.6 filed 22 Mar. 2011.

Each front end converter stage may operate substantially independently in the sense that it may be separately enabled or disabled, to thereby shape the efficiency curve of the combined system. This is particularly beneficial in a system which is operating at less than 100% of its available power (rating). Soft switching of a power converter may be employed during enable/disable of a converter, for example by frequency modulation and/or duty cycle modulation. Embodiments also use phase offset switching of the converter stages to minimise ac ripple current losses as well as dc losses. Each converter stage may be designed to operate at 50% of the maximum load (plus some additional margin); output inductance may be used to enforce 50/50 sharing (though this is not essential).

Figure 4A:
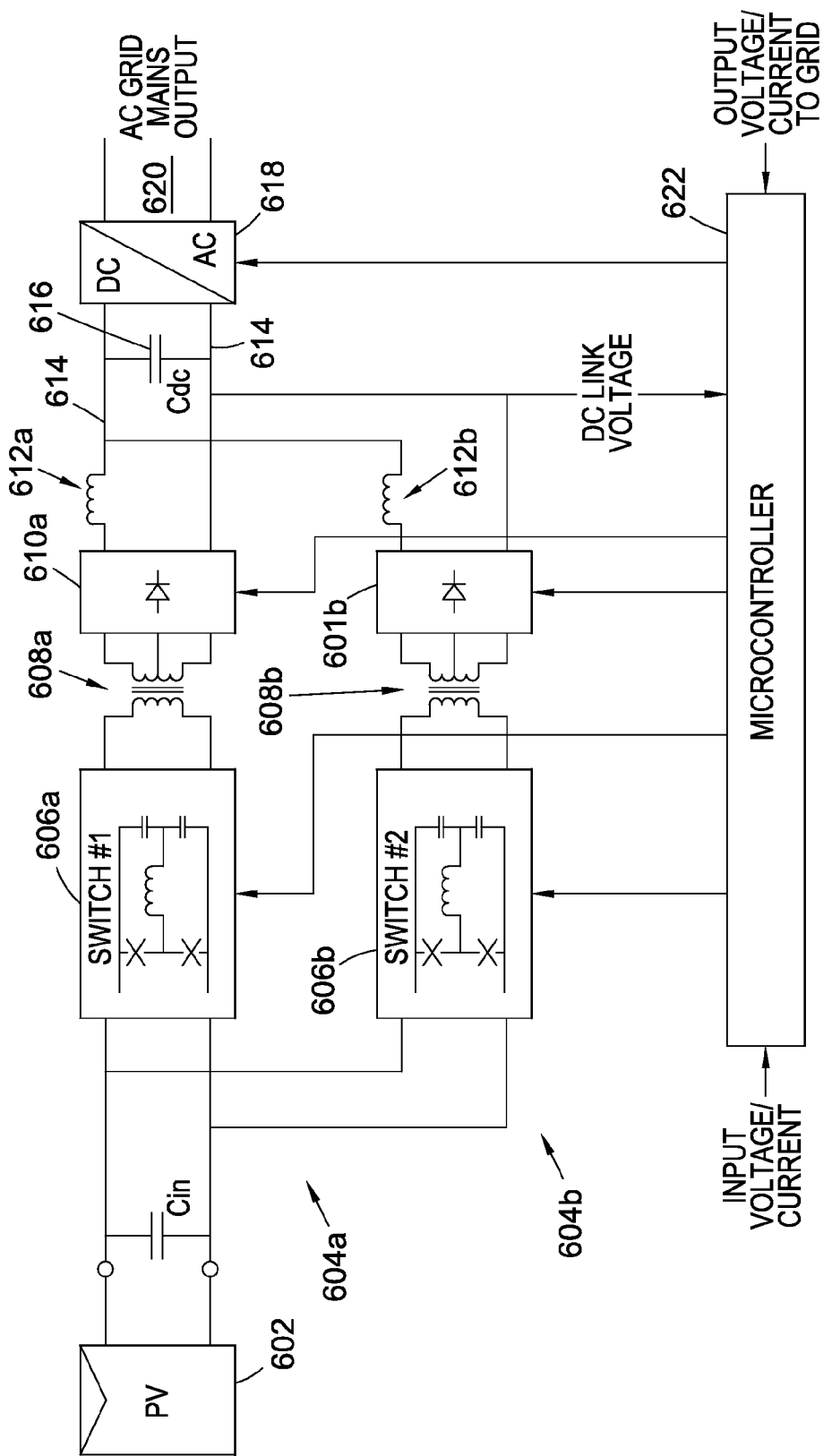
FIGS. 4a to 4d show, respectively, a power conditioning circuit comprising multiple parallel boost/isolation stages according to embodiment of an aspect of the invention, a more detailed circuit diagram for portion of the power conditioning unit of FIG. 6a, a power conditioning unit including multiple parallel boost/isolation stages each comprising a transformer with an integrated output inductor according to an embodiment of the invention, and waveforms illustrating examples of switching phase offset in a power conditioning unit comprising parallel boost/isolation stages using an LLC conversion topology.

Thus referring now to FIG. 4a, this shows a first embodiment of a power conditioning unit 600 according to an aspect of the invention. In the architecture of FIG. 4 a photovoltaic module 602 provides a dc power source for first and second dc-to-dc power conversion stages 604a, b, in this example each comprising an LLC resonant converter. Thus each of power conversion stages 604 comprises a dc-to-ac (switching) converter stage 606a, b to convert dc from module 602 to ac for a respective transformer 608a, b. The secondary side of transformers 608a, b are coupled to respective rectifying circuits 610a, b, which in turn provide a dc output to a respective series-coupled output inductor 612a, b. Each of output inductors 612a, b is coupled to a dc link 614 of the power conditioning unit, to which is also coupled a dc link capacitor 616. A dc-to-ac converter 618 has a dc input from a dc link and provides an ac output 620, for example to an ac grid mains supply.

A microcontroller 622 provides switching control signals to dc-to-ac converters 606a, b, to rectifying circuits 610a, b (for synchronous rectifiers), and to dc-to-ac converter 618 in the output 'unfolding' stage. As illustrated microcontroller 622 also senses the output voltage/current to the grid, the input voltage/current from the PV module 602, and, in embodiments, the dc link voltage. In some preferred embodiments the microcontroller 622 implements a control strategy as previously described, although the operation of embodiments of the invention is not tied to any particular control strategy or, for example, to any particular MPPT (maximum power point tracking) strategy.

In the circuit of FIG. 4a the output inductors 612a,b effectively force load sharing between the front end converters 604a,b. (We refer to the addition of the individual chokes in the output circuit as proportional load sharing). Efficiency gains arise because LLC converters are core-loss dominant, so a smaller core enabled by a reduced power rating for each individual converter reduces the overall core losses. Furthermore if the power of each converter falls by a factor of 2, the $I^2R$ losses fall by a factor of 4 (per Watt). These techniques are particularly useful for microinverters, for example with a maximum rate of power of less than 1000 Watts and/or connected to just one or two PV modules. This is because in such systems the panel voltages can be as low as 20 volts and hence the conversion currents can be in excess of 30 amps RMS.

Figure 4B:
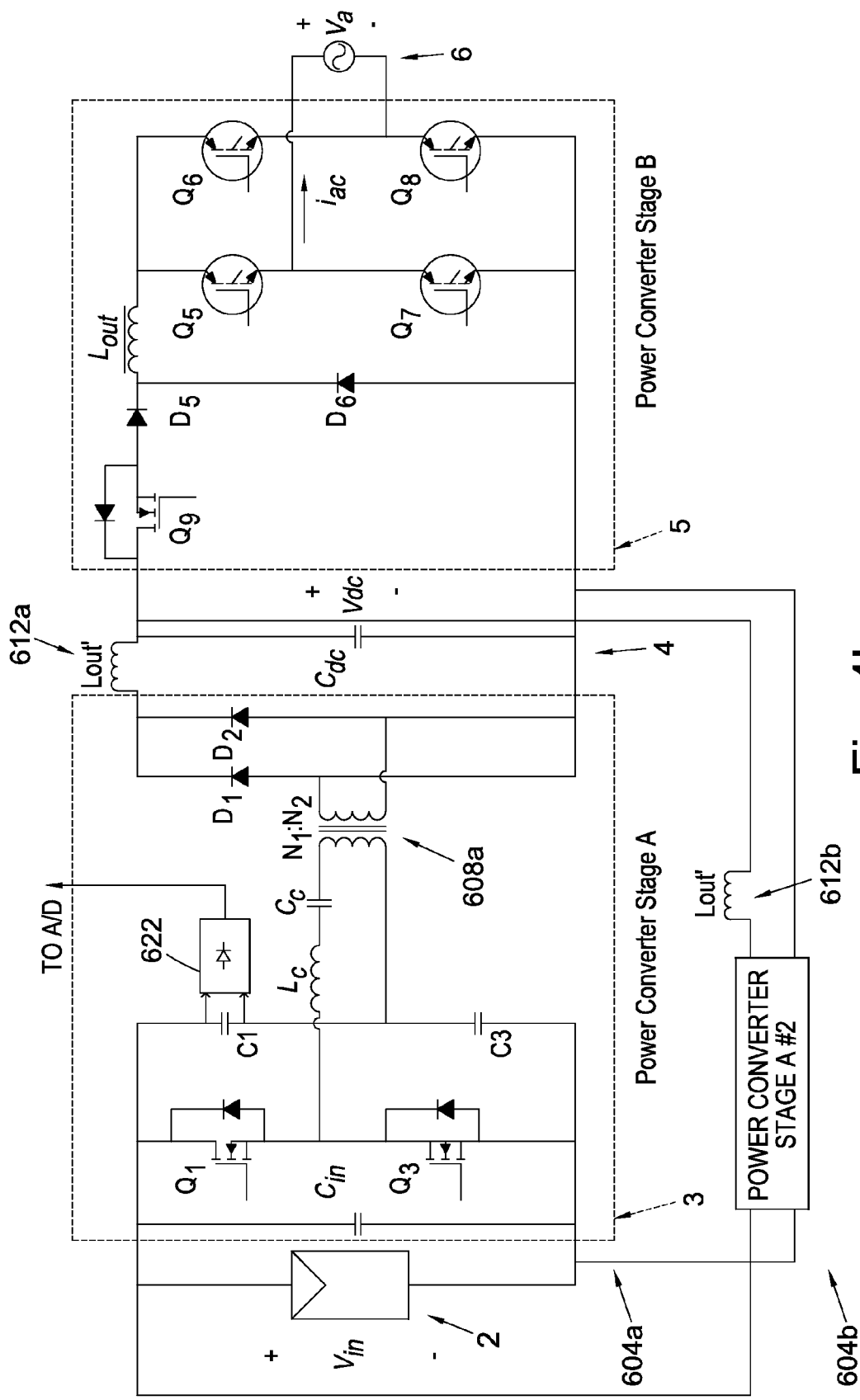

Referring now to FIG. 4b, this shows details of a portion of an example implementation of the arrangement of FIG. 4a. This example arrangement employs a modification of the circuit of FIG. 2a and like elements to those of FIG. 2a are indicated by like reference numerals; likewise like elements to those of FIG. 4a are indicated by like reference numerals. In the arrangement of FIG. 4b an LLC converter is employed (by contrast with FIG. 2a), using a pair of resonant capacitors C1, C3. FIG. 4b illustrates ripple current sensing to sense the available power from the photovoltaic module. As illustrated a circuit 622 rectifies a ripple voltage across one or both of the resonant capacitors and provides an output, for example to an analogue-to-digital converter for interfacing with microcontroller 622. The available power is dependent upon the level of ripple, and the illustrated arrangement provides an efficient way of measuring available power from the panel.

Figure 4C:
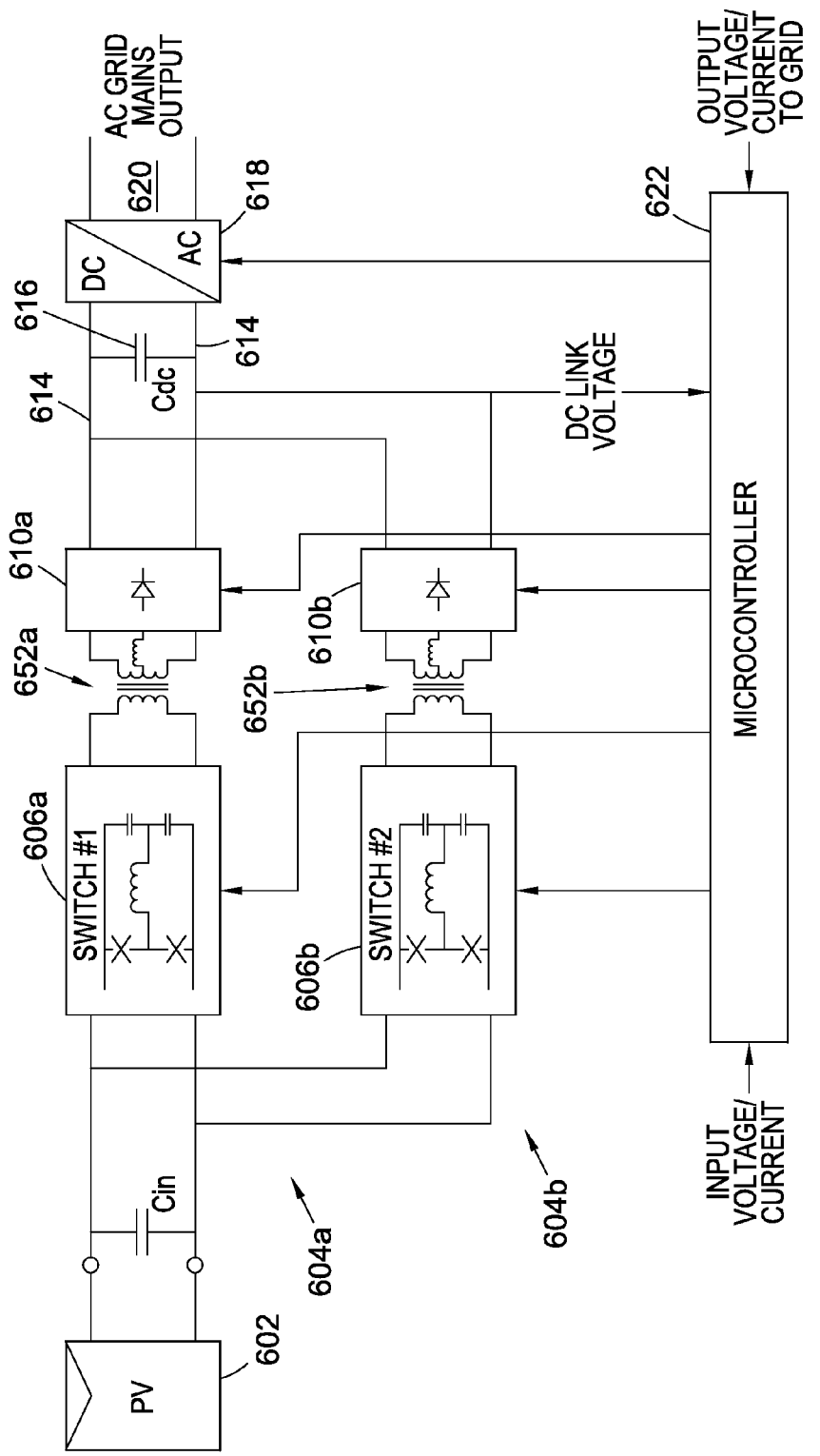

Referring now to FIG. 4c, this shows a second embodiment of the power conditioning unit 650 similar to that of FIG. 4a but with an improved arrangement of output inductors. More particularly the output inductors 612 of the FIG. 4a are incorporated into respective transformers 652a, b of the front end dc-to-dc converter stages to facilitate load sharing between the conversion stages.

Figure 4D:
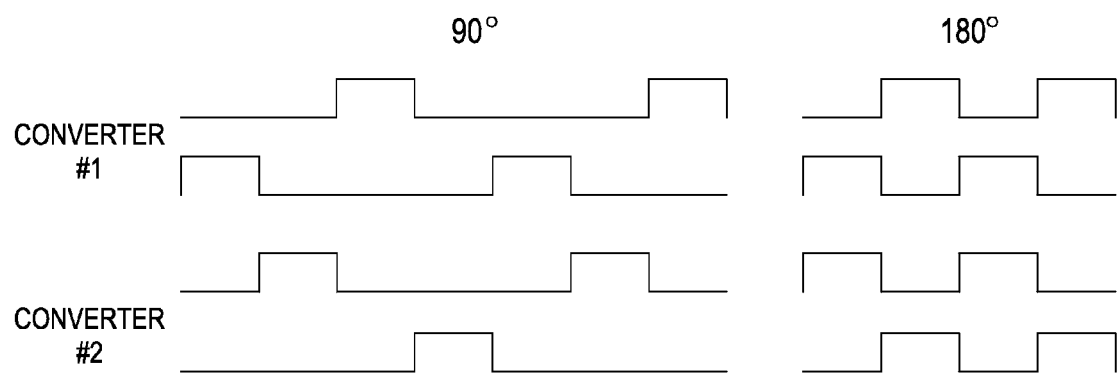

FIG. 4d illustrates example waveforms of multiphase interleaving of the switching of the converters 604a,b (in the Figure the waveforms illustrate example data control signals of the switches in stages 606a, b of the converters). To reduce ripple on the input capacitor the switching is preferably 180° out of phase between the two converters. However in embodiments the rectification circuits 610a,b of the power converters may be shared (not shown), i.e. so that a common set of rectifiers/rectification circuits is employed for both converters. In this case the interleaving between the dc-to-ac conversion portions of the dc-to-dc converters 604a,b may be interleaved 90° out of phase, as illustrated in FIG. 4d. This provides further efficiencies in circuit simplification, albeit at the expense of increased ripple.

At low input/output powers it is more efficient to run just a single front end converter 604, to reduce core loses in the transformer, but at higher input/output powers it is more efficient to run both converters, to reduce resistive losses. To avoid rapid dumping of the energy stored in a transformer 608 preferably microcontroller 622 is configured to switch a converter on/off gradually, for example either by gradually moving the switching frequency off resonance and/or by gradually reducing the duty cycle of a PWM control signal to the converter switch, to reduce the switch on-time and thus gradually dissipate the stored energy. Such techniques may also be employed to turn a converter partially on or partially off. The point at which a change-over occurs between running one converter and running both converters is best determined by experiment, for example by plotting curves of efficiency and/or loss when running two converters and when just running a single converter, to determine the change-over point. Optionally the switching point may be biased towards either single or dual converter use (for example in the latter case to reduce overall component stresses and hence potentially prolong lifetime), and/or arranged to provide some hysteresis in the switching.

MPPT (Maximum Power Point Tracking) Techniques

Our preferred implementation of maximum power point tracking (MPPT) for use with the above described solar photovoltaic system architecture comprises a power injection control block with a sense input coupled to the (non-electrolytic) energy storage capacitor and an output coupled to control the dc-to-ac converter, to control power injected into the ac mains without needing to measure a dc voltage or dc current provided from said dc power source. This arrangement may also be used in embodiments of the invention we describe later, but preferably also with additional, sub-string MPPT tracking loops.

As previously described in embodiments of our preferred architecture a voltage on the energy storage capacitor has a sinusoidal voltage component (at twice the frequency of the ac mains), and the power injection control block controls an amplitude of an ac current provided to the ac mains power supply output such that an amount of power transferred to the output is dependent on an amplitude of the sinusoidal voltage component on the energy storage capacitor. In embodiments the average energy transferred is linearly dependent on, more particularly proportional to, a squared value of the sinusoidal voltage component. The sinusoidal voltage component is superimposed on a dc link voltage (input to the dc-to-ac converter), and this link voltage is relatively high, for example on average greater than 200, 300, or 400 volts. The average power transferred is proportional to the difference between the peak (maximum) capacitor voltage squared and the trough (minimum) capacitor voltage squared (although the unit may alternatively be arranged such that there is, on average, zero dc voltage on the energy storage capacitor). The instantaneous power transferred to the ac mains power supply output is proportional to the instantaneous value of voltage on the energy storage capacitor.

In embodiments the method/system comprises two independent control blocks. The first block controls the voltage amplification stage that interfaces with the energy generator. The energy generator is preferably a solar module. In embodiments the first control block does not function to regulate the amount of energy to be transmitted but functions only as a switch, either allowing energy flow or preventing any energy flow from the generator and through the amplification stage, regardless of the amount. The output of the voltage amplification stage is coupled to an energy reservoir capacitor. Energy flow is therefore dependent on the amount of "room" (the amount of additional energy which can be stored) in the reservoir capacitor. The second control block is a feedback control loop that interfaces the energy reservoir capacitor to the coupled output load. The second control block regulates the amount of power to be injected into the load by emptying the energy reservoir capacitor. The second control block uses, in embodiments exclusively, the level of voltage fluctuations on the energy reservoir (storage capacitor) to control the amount of power being extracted from the energy generator and also the amount of power being injected into the load. In embodiments no use of (measured) current values is made. Thus in embodiments the maximum power point tracking uses two completely independent loops and uses exclusively variations characteristic of the reservoir capacitor.

Figure 5A:
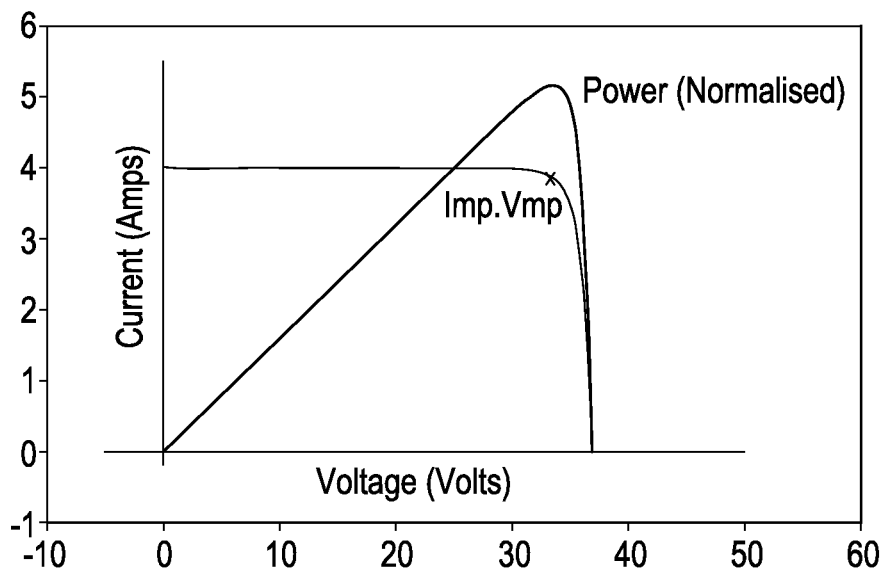
FIGS. 5a and 5b show example output current-voltage characteristic of photovoltaic panels indicating the locations of a maximum output power point.

Energy generators such as solar photovoltaic cells have a non-linear power characteristic profile, such as those illustrated in FIG. 5. In FIG. 5a maximum power is harvestable at the point labelled X, which exhibits maximum power point current Imp and voltage Vmp. It is preferable that the operating point that yields most energy is attained and maintained.

Figure 6A:
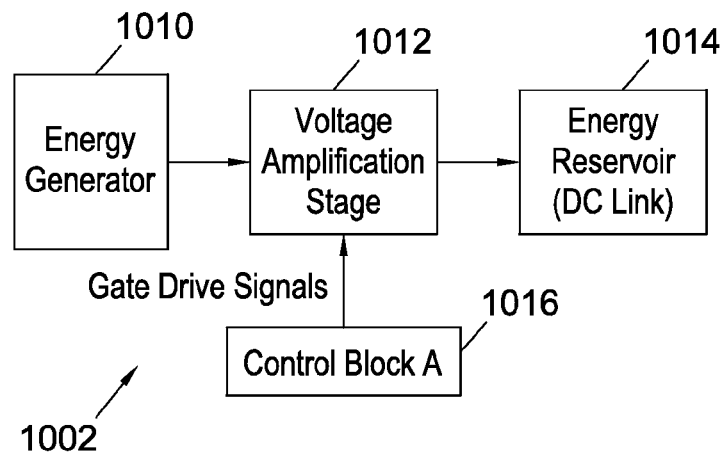
FIGS. 6a and 6b show, respectively, a block diagram of an example dc input portion and a block diagram of an example ac output portion of a photovoltaic power conditioning unit incorporating an MPPT tracking system.
Figure 6B:
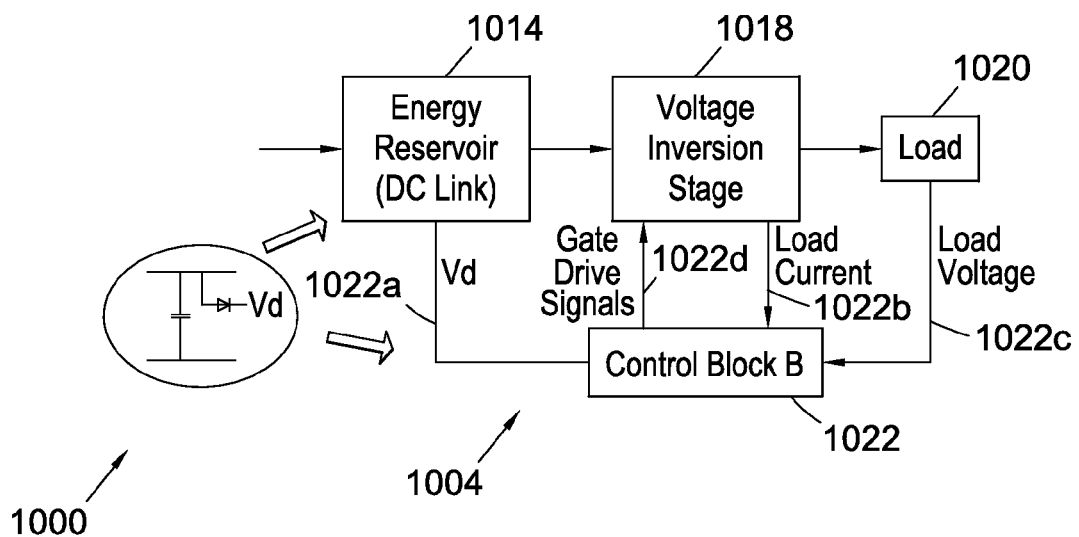

Referring to FIGS. 6a and 6b, these show a block diagram of input 1002 and output 1004 stages of an embodiment of a solar PV power conditioning system 1000. Thus FIG. 6a shows an energy generator 1010 such as one or more PV panels feeding a voltage amplification stage 1012 with a substantially constant amplification factor (which may be less than, equal to, or greater than unity depending, for example, on whether the dc input is from a single PV panel or a string of series connected panels). This in turn provides power to an energy reservoir 1014, in embodiments a storage capacitor coupled to a dc link between the input, voltage amplification stage and an output, voltage inversion stage. In FIG. 6a control block A 1016 controls voltage amplification stage 1012, but only to switch power from the energy generator on and off into the energy reservoir: it does not provide a variable gain control and simply comprises a fixed frequency oscillator. Voltage inversion stage 1018 has an input coupled to the energy reservoir 1014 and provides an ac mains output to load 1020, for example via a grid connection. Control Block B 1022 monitors the voltage on the dc link via sense connection 1022a (but in embodiments does not sense the current on this link), and the current into and voltage on the load via sense connections 1022b,c (in embodiments connection 1022c is within the power conditioning unit), and provides gate drive output signals 1022d for controlling the voltage inversion ("unfolding") stage 1018, more particularly for controlling the power drawn from the energy reservoir and provided into the load via the grid. The gate drive signals 1022d are sequenced to control the power converter switches of the power conversion stage 1018 (see also FIG. 2); this provides a convenient technique for controlling the switching frequency of this stage. Thus here control block A functions as a power switch, allowing power to flow from the energy generator to the voltage amplification stage (or effectively switching the voltage amplification stage on/off or in/out); it can also be set to turn off power from the energy generator in the event, for example of under/over-voltage conditions.

The voltage amplification stage can have a fixed or variable amplification ratio; it may comprise a half-bridge, a full bridge, a push-pull or a similar voltage inversion stage coupled to a transformer, whose amplification ratio results in a desired voltage in the DC link reservoir capacitor, for example of order 400 volts. The output of the transformer is coupled to a rectifier stage. An inductor may be included between the rectifier bridge and the DC link reservoir capacitor.

Figure 7A:
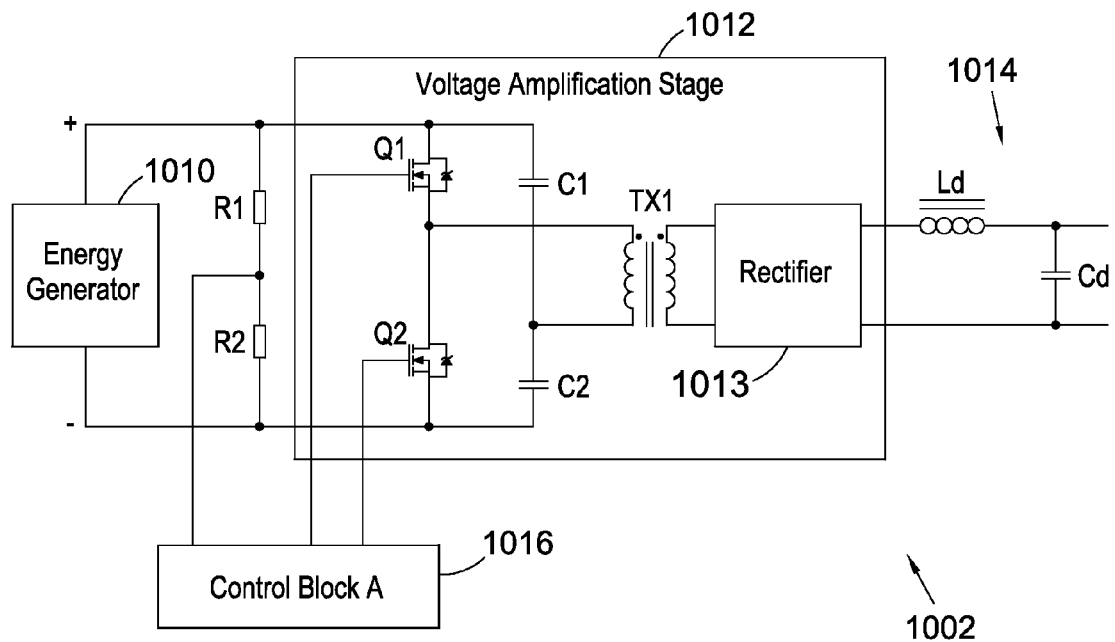
FIGS. 7a and 7b show, respectively, a circuit diagram of an example dc input portion and of an example ac output portion of a photovoltaic power conditioning unit incorporating an MPPT tracking system.

FIG. 7a shows a more detailed circuit diagram of an example input stage 1002. The voltage amplification stage comprises a half-bridge, which in turn is made up of two series switches (MOSFETs), Q1 and Q2, and two series capacitors C1 and C2, and the transformer TX1. A rectifier bridge 1013 made up of diodes is coupled to the output of the transformer and to the DC link capacitor Cd via a filter inductor Ld. The control block in FIG. 7a produces a constant duty cycle PWM signal, and hence no modulation is implemented. In the event that Cd is full, defined as the voltage across it being equal or larger than the rectified output from transformer secondary, no power flows into Cd even though Q1 and Q2 are switched on and off continuously. Hence in this arrangement control block A does not regulate the amount of power extracted from the generator.

Figure 7B:
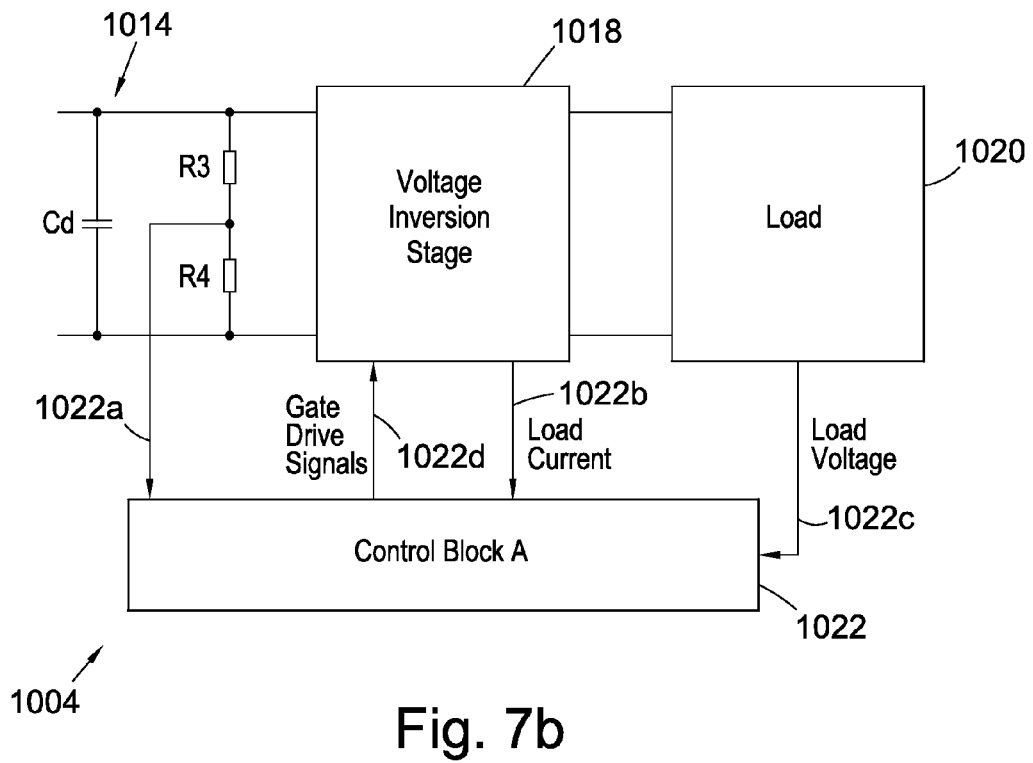

FIG. 7b shows a more detailed circuit diagram of an example output stage 1004 implementing "back-end" MPPT control methodology: control block B measures the voltage fluctuations in the DC link that are used for regulation of the amount of power being harvested from the energy generator and therefore the amount of power injected into the load. A preferred load is the utility grid—in the case of the grid load, control B measures the peak and trough voltages on the DC link capacitor via a scaling circuit (the potential divider circuit of R3 and R4). The scaled values of the peak Vp and the trough Vt voltages are used to compute the amount of power flowing through the capacitor (as described below). In embodiments the voltage sense connection to Control Block B is via a rectifier.

Figure 8:
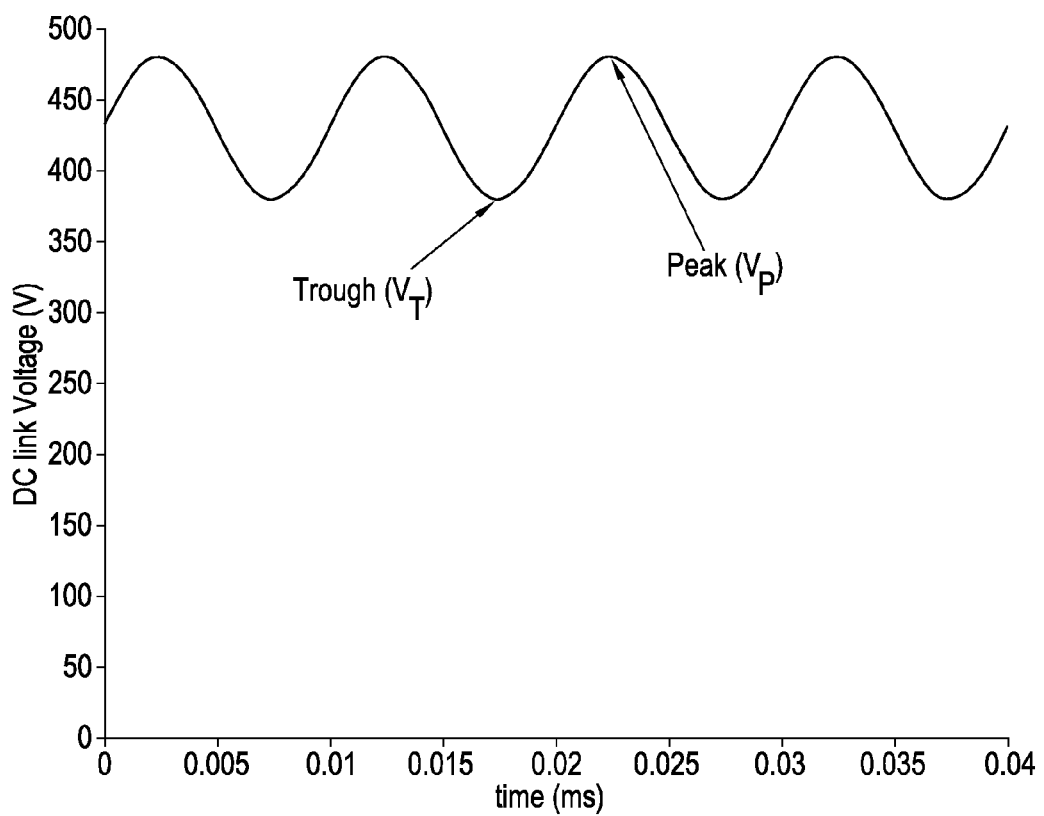
FIG. 8 shows the voltage on a DC link capacitor voltage in a photovoltaic power conditioning unit incorporating an MPPT tracking.

Due to the AC nature of the power being transferred into the grid and the current-voltage characteristic of the power being generated by the solar module, energy storage is essential in a PV inverter if maximum power is to be harvested from the solar module. In our preferred described above architecture energy storage is delegated to the DC link reservoir capacitor. The amount of power transferred into the grid is related to the energy change in the capacitor and therefore the voltage ripple on the capacitor. Implementing energy storage on the DC link allows a large ripple on the capacitor. Equation 1 illustrates the relationship between energy change, the capacitance and the voltage on the capacitor:

$$U_R = \frac{1}{2} C_{dc} (V_P^2 - V_T^2) \quad (1)$$

where $V_P$ is the capacitor peak voltage and $V_T$ is the capacitor trough voltage. The power transferred would be the energy change per second. FIG. 8 illustrates the fluctuation (sinusoidal ripple) on the DC link capacitor. Control block B automatically achieves MPPT by regulating the amount of injected current with reference to (dependent on) the dc link voltage fluctuation. However this MPPT tracking technology is not restricted to a power conditioning unit which deliberately allows (and controls based on) a degree of ac ripple on the dc link.

Consider an input current and voltage I, V to the inverter provided by a photovoltaic power source, a dc link current and voltage $I_d$, $V_d$, and an output current and voltage into grid mains of $I_{grid}$, $V_{grid}$. Since $V_{grid}$ is approximately constant, the power injected into the grid mains is proportional to $I_{grid}$. Also, absent losses, the input power $I.V=I_d.V_d$, and thus $I_d.V_d$ determines the point on the photovoltaic IV characteristic at which the system operates. Broadly speaking the system senses the ripple on $V_d$ which, in embodiments, (as described above) is a measure of the power flowing through the dc link. More particularly the system controls the output "unfolding" stage (for example a buck stage converter) to maximise the level (amplitude) of this ripple component on the dc link voltage/energy storage capacitor, and hence also to maximise the power injected into the ac mains. (The skilled person will appreciate that $V_d$ on its own does not provide a good measure of the power on the dc link).

In one implementation the control block 1022 generates a half sinusoidal template voltage (with an amplitude varying between zero and 3.3 volts) in phase with the grid, for comparison with a (rectified) version of the sensed load current 1022b. The sensed load voltage 1022c is used only to determine the phase of the ac mains. The amplitude of the template is adjusted dependent on the level of ripple sensed on the energy storage capacitor/dc link (via line 1022a). If the template amplitude is greater than the amplitude of the sensed grid current the switching frequency is increased to inject more power into the grid, and vice versa. Thus, broadly speaking, the amplitude of the template is adjusted dependent on the dc link ripple and the output current is controlled to match the template amplitude.

Figure 9:
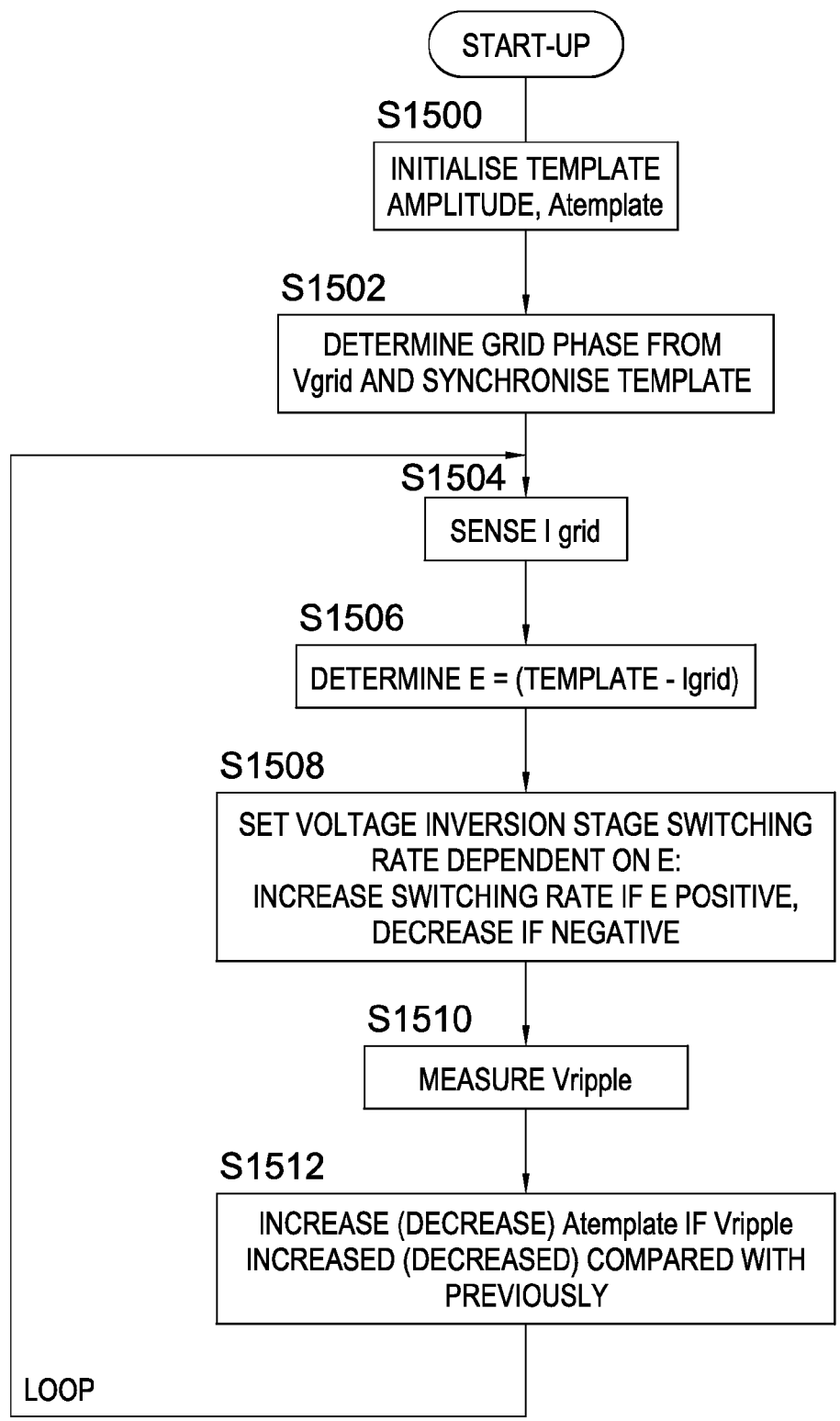
FIG. 9 shows an example control procedure for the power injection control block of the power conditioning unit of FIG. 6.

FIG. 9 shows an example control procedure for control block B 1022 (many variations are possible). Presuming that the procedure begins at start-up of the inverter, the procedure first initializes the amplitude of the template signal to an arbitrary, relatively low value, for example 0.5 volts on the previous 0.0-3.3 volts scale (step S1500). At this point the output voltage from the photovoltaic panel is at a maximum and the output current is at substantially zero; the level of ripple on the dc link is also substantially zero. The procedure determines the phase of the ac grid mains voltage (S1502) and synchronises the half-sinusoidal template to the grid. The procedure then senses the grid current (S1504), for example by sensing the voltage across a current sense resistor; at start-up this will be approximately zero. The procedure then determines an error value E from the difference between the template and the sensed grid current (S1506), which at start-up (continuing the previous example) will be 0.5. The procedure then determines a switching rate for the voltage inversion stage 1018 dependent upon this error, in one example algorithm increasing the switching rate if E is positive and decreasing the rate if E is negative. Thus in the present example, at start-up the template amplitude is greater than that of the sensed grid current so the switching rate is increased. This increases the current (and hence power) injected into the ac grid mains, so that the ripple voltage on the dc link also increases.

At step S1510 the procedure measures the ripple voltage on the dc link and, at step S1512, adjusts the template amplitude dependent on this measurement, increasing the amplitude if the ripple voltage increased, and vice versa. The procedure then loops back to step S1504 to once again sense the current being injected into the ac mains. Thus if, say, the error is positive the template amplitude increases so that it is once again greater than the amplitude of the sensed current injected into the grid, and the switching rate of the voltage inversion stage is once again increased. However if the previous change decreased the measured ripple voltage (which senses the power drawn from the photovoltaic panel), then the template amplitude, and hence switching rate of the voltage inversion stage, is also decreased. In this way the control technique operates to control the output voltage inversion stage such that the photovoltaic panel is maintained at substantially its maximum output power point. With this arrangement there is no need to measure the dc voltage and current from the PV panel.

These MPPT tracking techniques may also be used with other types of inverter, for example a 'four-switch' inverter as described in our U.S. Pat. No. 7,626,834 (in particular if this is provided with a half or full bridge dc boost stage (with a transformer) at the front end).

Photovoltaic Panels

In photovoltaic (PV) modules or panels the panel is made up of cells each having a forward voltage of around 0.6V, forward diode drop. These are then series connected to form sub-strings, nominally of around 10V for a 60 cell module, and 12V for a 72 cell module. Each sub-string is bypassed by another diode device to protect the cell structure when a cell or number of cells are shaded.

Figure 10A:
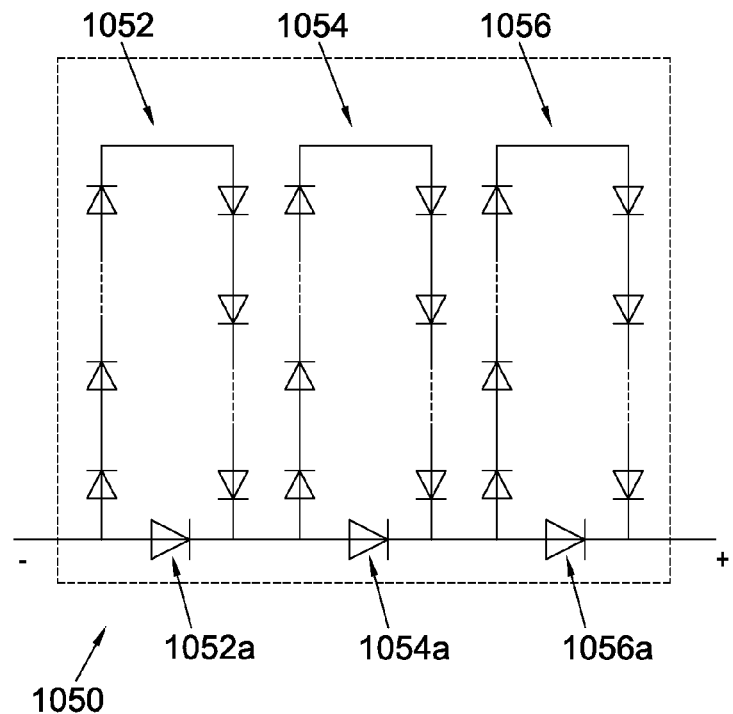
FIGS. 10a and 10b show, respectively, an example internal circuit of a PV panel, illustrating bypass diodes, and an equivalent electrical circuit for a photovoltaic cell.

FIG. 10a shows an example internal construction of a photovoltaic panel 1050, here comprising three sub-strings each comprising a plurality of solar cells (diodes) 1052, 1054, 1056, for example three sub-strings of 24 diodes or three sub-strings of 18 diodes for a 72 cell solar module. Each sub-string is provided with a respective bypass diode 1052a, 1054a, 1056a. The p-n junctions of the diodes in the strings each generate a voltage which may typically be of order 0.5-0.6 volts; the forward voltage drop across a bypass diode may be of order 0.5-1.0 volts.

The bypass diode offers an alternate path from the current sources formed by the other sub-strings. Failure to bypass can result in long term degradation of a cell and premature failure of the panel. In addition when bypassed the cell will likely cause degradation of the overall panel and if excessive shading occurs drop out of the inverter driving the grid.

Figure 10B:
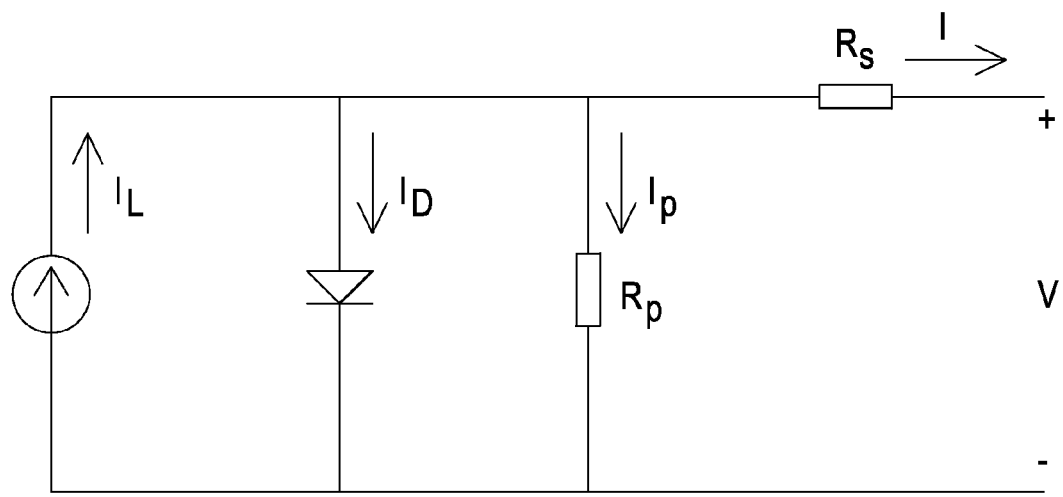

FIG. 10b shows the equivalent circuit of a photovoltaic cell. The current source represents the photocurrent (IL), generated at the junction region by the photons with energy enough to produce pairs of electrons-holes; the diode represents the PN junction with reverse saturation current (ID); Joule losses and leakage currents are represented by the currents through the series resistance (RS) and the shunt resistance (RP) respectively.

When the first Kirchoff law is applied to one of the nodes of the equivalent circuit, the current supplied by a cell, at a specified temperature, is given by:

$$I = I_L - I_D - I_P = I_L - I_0 \left\{ \exp\left[\frac{e(V + IR_S)}{NmKT_{cel}}\right] - 1 \right\} - \frac{V + IR_S}{R_P} \quad (1)$$

where:
  I is the output current
  IL is the photocurrent
  ID is the diode current
  IP is the leakage current
  I0 is the reverse saturation current
  N is the number of cells associated in series
  m is the diode ideality factor, which lies between 1 and 2 for monocrystalline silicon
  K is the Boltzman constant
  Tcel is the cell temperature
  e is the electron charge
  V is the terminal voltage
  RS is the series resistance
  RP is the shunt resistance
for an association of cells (as in a photovoltaic module), that is where N is the number of cells connected in series. Most of the photovoltaic modules available in the market are constituted by 30 to 36 cells.

Referring back to FIG. 5b, three points of the curve may be highlighted:
  a) open-circuit: this point is obtained when the terminals of the module are disconnected. The module presents a voltage called the "open-circuit voltage" VOC.
  b) short-circuit: the terminals of the module are connected with an ideal conductor, through which flows a current called the "short-circuit current" (ISC). In this situation, the voltage between module terminals is zero.

c) maximum-power: point where the voltage versus current product is maximum.

Figure 5B:
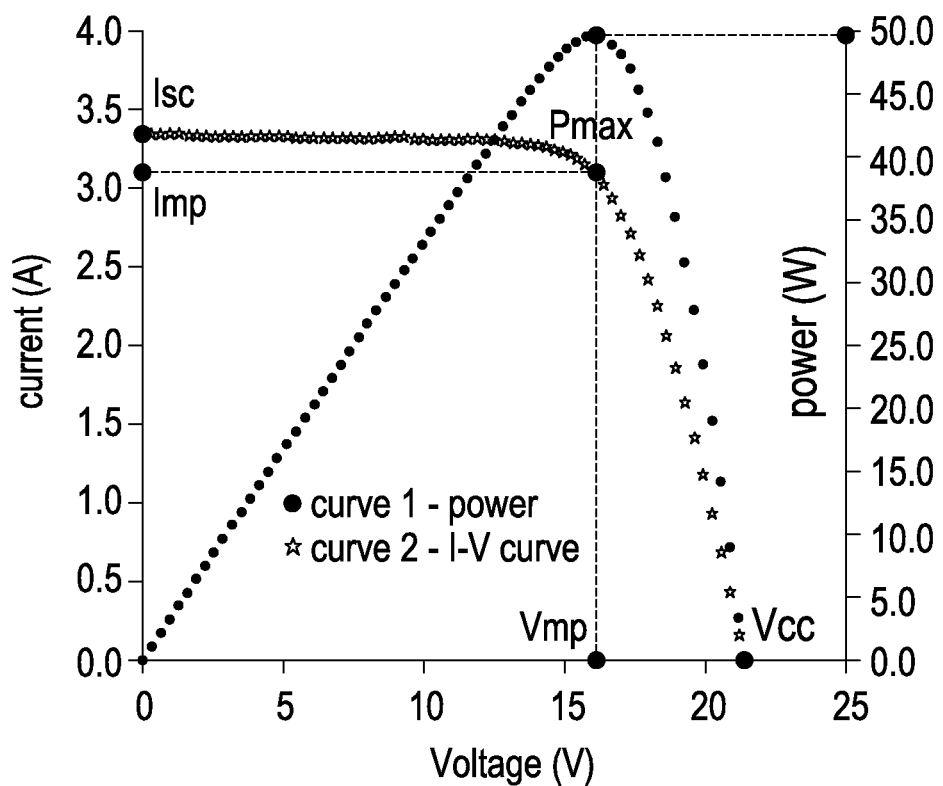

FIG. 5b shows a generic characteristic curve. It can be observed that, from the short circuit, the current presents a slightly descending behaviour until it reaches to an "elbow" from where it decreases quickly down to zero.

Sub-String Power Conversion Systems

We will describe techniques which avoid the need for bypass diodes. More particularly we will describe techniques which perform local conversion of the sub-strings to enable maximum control of the power range available from the panel; this may be in the order of a single 1 W at the sub-string level allowing higher yield. In addition this allows local MPPT control adjustment within the nominal control range to adjust the impedance seen by the Inverter locally from each string—the methods we describe above are effectively an average of all three string control points, which may not be optimum for each string under all operating conditions. Additionally the loss in the bypass diodes has been the concern for panel reliability and is by far the highest failure rate mechanism in PV panels. The active bypassing we will describe affords lower power loss and hence higher reliability for the PV system. Further, voltage sensing of each sub-string can be achieved using an active current source referenced to either a +ve or −ve PV terminal, thus simplifying the control scheme.

System Architecture

Figure 11A:
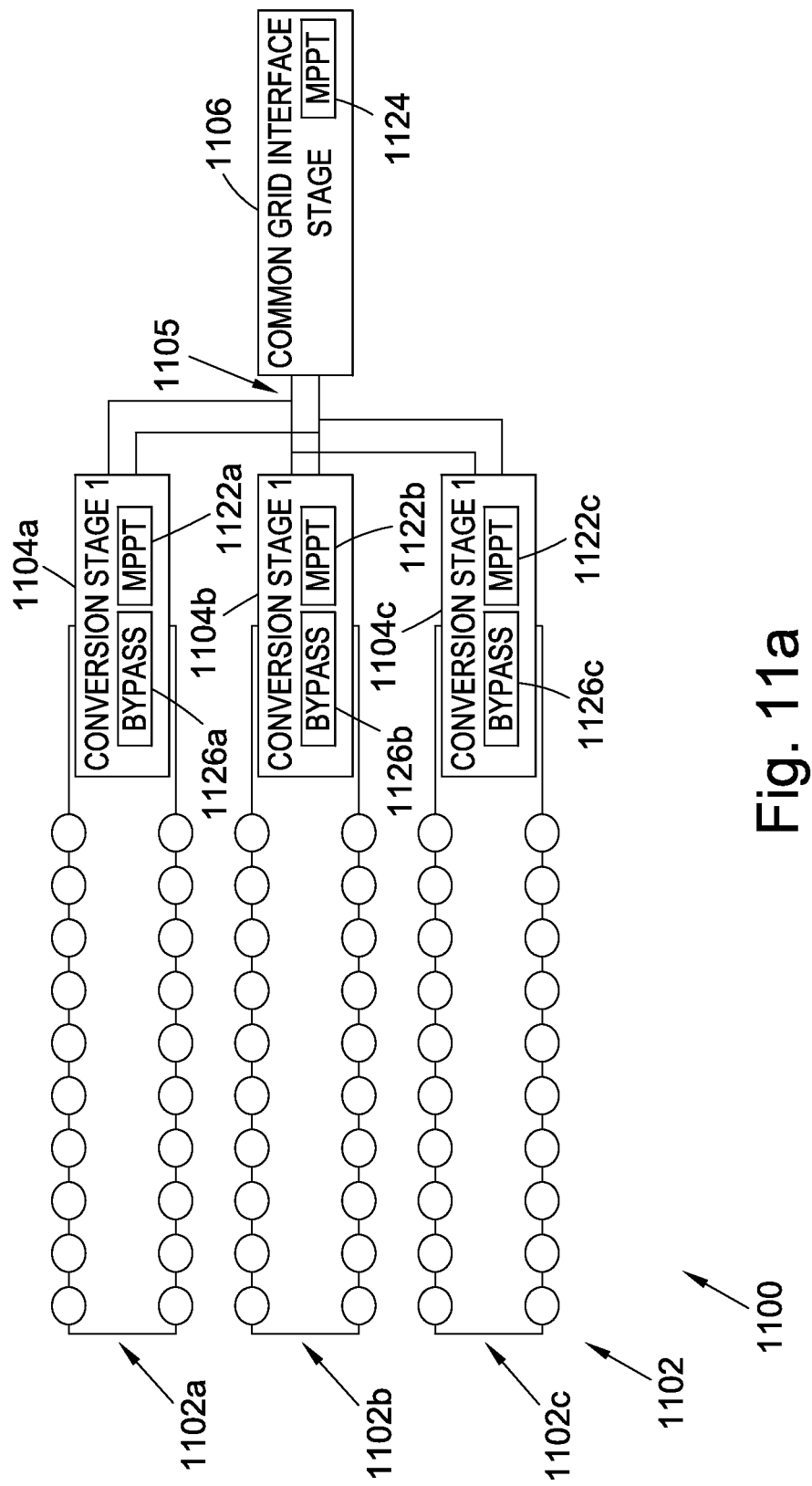
FIGS. 11a and 11b show, respectively, first and second example system architectures for photovoltaic panel/inverter systems according to embodiments of the invention.

A block level diagram for a first example system architecture 1100 is shown in FIG. 11a. The PV module 1102 is divided into three independent separate sections 1102a,b,c and each section is considered as a sub-string. The number of sub-strings can vary depending on the number of solar cells in the module. Effectively each section operates in parallel: Each sub string is connected to a respective power conversion stage 1104a,b,c—preferably a dc-to-dc converter which may comprise, for example, a boost circuit, half bridge, full bridge or a flyback circuit. By way of example we describe below a full bridge circuit connected to a high frequency transformer. The conversion stages 1102a,b,c are coupled to a common bus 1105, which may, but need not necessarily be a common dc bus, and this common bus 1105 provides power to a common grid interface stage 1106.

Figure 12A:
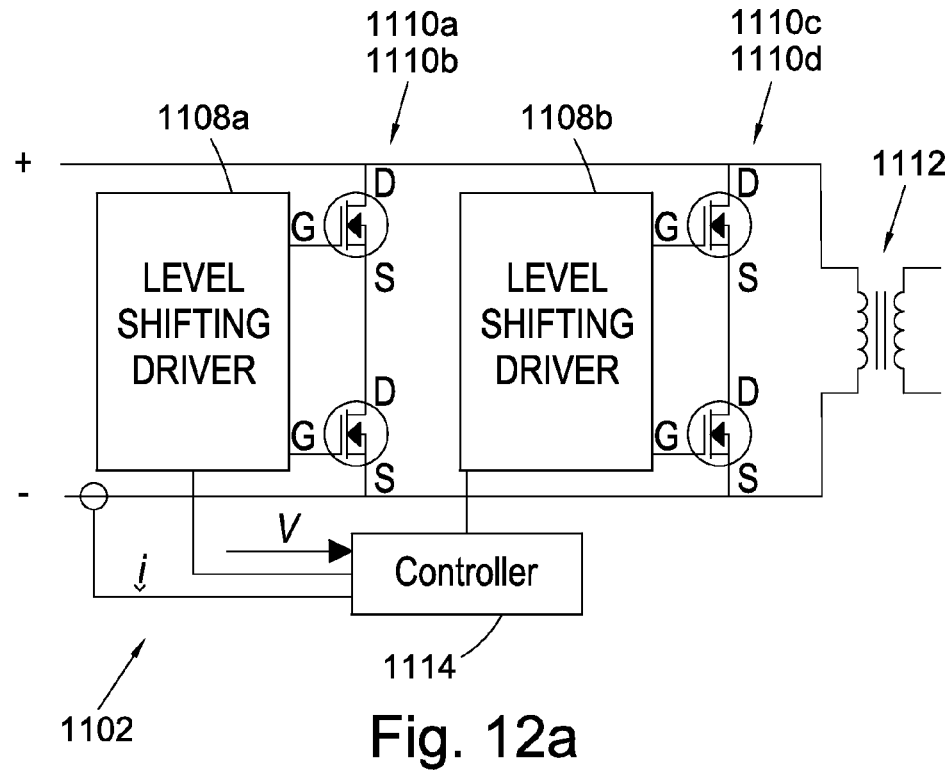
FIGS. 12a and 12b show, respectively, an example implementation of an input power conversion stage and of a common grid interface stage, for the architectures of FIG. 11.

A simple implementation of a conversion stage 1102 is shown in FIG. 12a. This example comprises four MOSFETs 1110a-d in a full bridge arrangement, driven by respective level shifting drivers 1108a,b, controlled by a controller 1114 and driving a transformer 1112. The MOSFETS may be rated to <100V for interfacing with the PV module; they may be switched at 50 kHz with resonant switching to minimize the switching losses. As shown in FIG. 11a, the outputs of the input stages 1104 are connected in parallel to a common secondary stage 1106. The skilled person will appreciate that, for example, a half bridge may be employed instead of a full bridge.

Figure 12B:
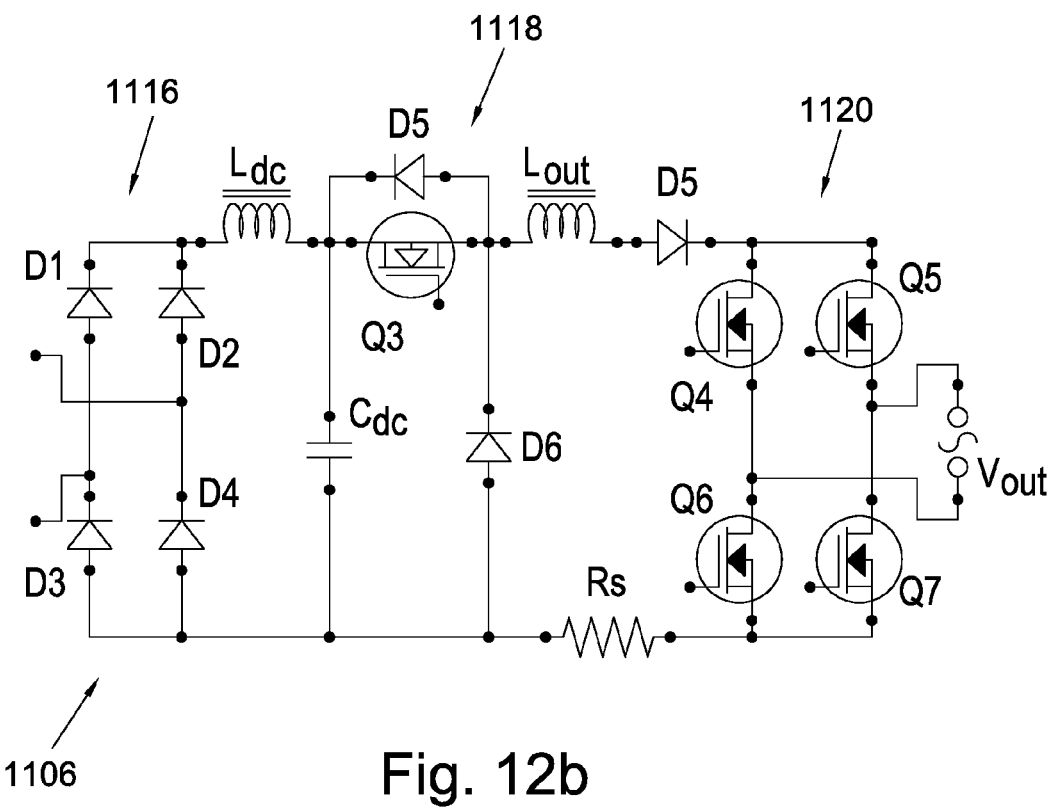

The secondary stage 1106 may comprise any of a variety of DC-AC conversion stages. An example, similar to those previously described, is shown in FIG. 12b. This example comprises a rectification stage 1116, here formed from four diodes, interfaced to a current shaping buck stage 1118 which in turn is connected to a inversion stage, for example a full bridge of MOSFETs 1120 operating at line frequency. There are many other alternatives to this, for example a single stage H bridge, using high frequency MOSFETs for current shaping and therefore eliminating the buck stage.

The three (or n depending on size of the PV module) sub-string conversion stages each include an MPPT controller 1122a,b,c to perform maximum power point tracking (MPPT). This is achieved by monitoring the current through each sub-string and the voltage across the sub-string. Any of a range of MPPT control techniques may be employed including, but not limited to, perturb and observe, an incremental conductance method, and a constant voltage method. Additionally or alternatively the MPPT may be undertaken at the centralised common grid interface stage, using an MPPT controller 1124, for example as previously described. Preferably two levels of MPPT are be employed to optimise the overall output from the unit.

The conversion stages 1104 may optionally incorporate a bypass module 1126a,b,c, for example comprising a power semiconductor switching device such as a MOSFET or IGBT switch, connected across a sub-string and controlled by a controller to turn the switch on when the need for the bypass function to be implemented is detected. In one approach the need for a bypass function to be implemented may be determined by determining whether there is significant mismatch in the current flow in or voltage across one of sub-strings compared to the others: this may be taken as an indication that there is shading, and depending on the level of disparity the shaded sub-string may then be bypassed. (This employs communication between the bypass modules 1126 which may be, for example, via software on one or more microcontrollers).

Alternatively a bypass function may be efficiently implemented using the MOSFETs 1110 and controller 1114 of FIG. 12a, bypassing a sub-string by switching the pair of MOSFETs shown in FIG. 12a on so that there is little or no current flow in the sub-string.

In a further approach a bypass function may be incorporated into an MPPT controller 1122. The need for a bypass function to be implemented may then be determined by using the sub-string MPPT controller 1122 to perform a (complete) sweep of the IV curve of the sub-string: If more than one peak is detected this can be taken as an indication of shading.

An advantage of MOSFET (or other active device) switching is that the conduction loss may be significantly reduced as compared to the use of bypass diodes. Bypass diodes typically have a forward voltage ~0.5V and MOSFETs can significantly reduce this, thus reducing losses.

In a variant of the above described bypass control functions, rather than completely shut down a shaded sub-string the sub-string may be only partially shut down, to continue to try to extract as much power from the sub-string as possible. For example, the temperature of one or more cells may be measured and the power conditioning unit controlled to operate the shaded sub-string intermittently below an upper threshold temperature or until an upper threshold temperature is reached.

Figure 11B:
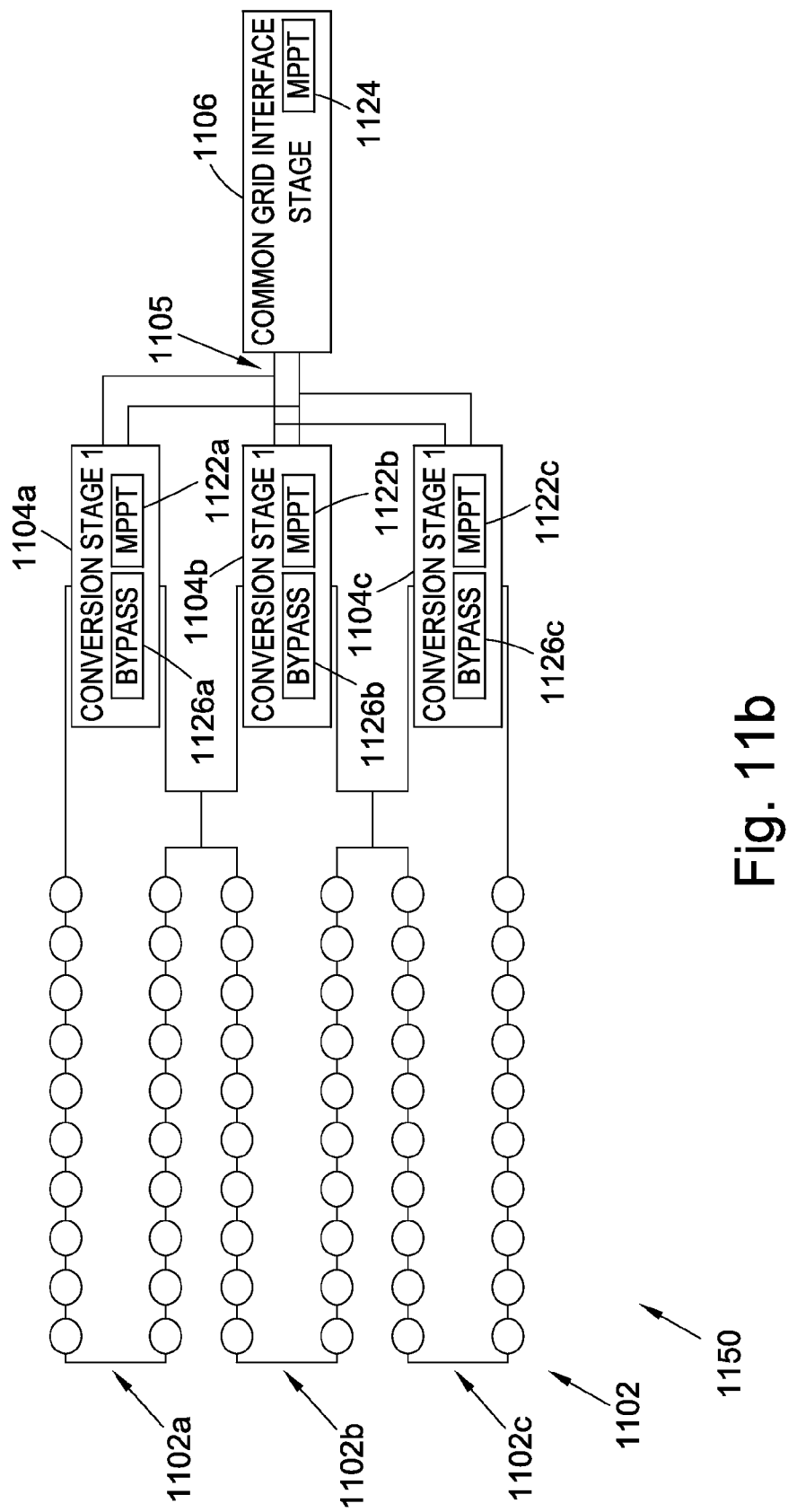

Referring to now FIG. 11b, this illustrates an alternative architecture 1150 in the context of which the above described techniques may also be employed. Thus in the architecture of FIG. 11b the DC-DC converter stages 1104 are connected in place of the by-pass diodes so that the inputs of the DC-DC converters are connected in series. In this approach the switching in the DC-DC converters may be undertaken synchronously to reduce ripple on the dc link. When a sub-string needs to be bypassed then the MOSFET(s) are left closed to shunt current which would otherwise flow through the sub-string and create a hot spot on the shaded cell(s).

For both of the above two approaches three transformers 1112 may be connected and operate in parallel, or a common transformer link to the common grid interface stage 1106 may be employed.

Circuit Implementation

Figure 13A:
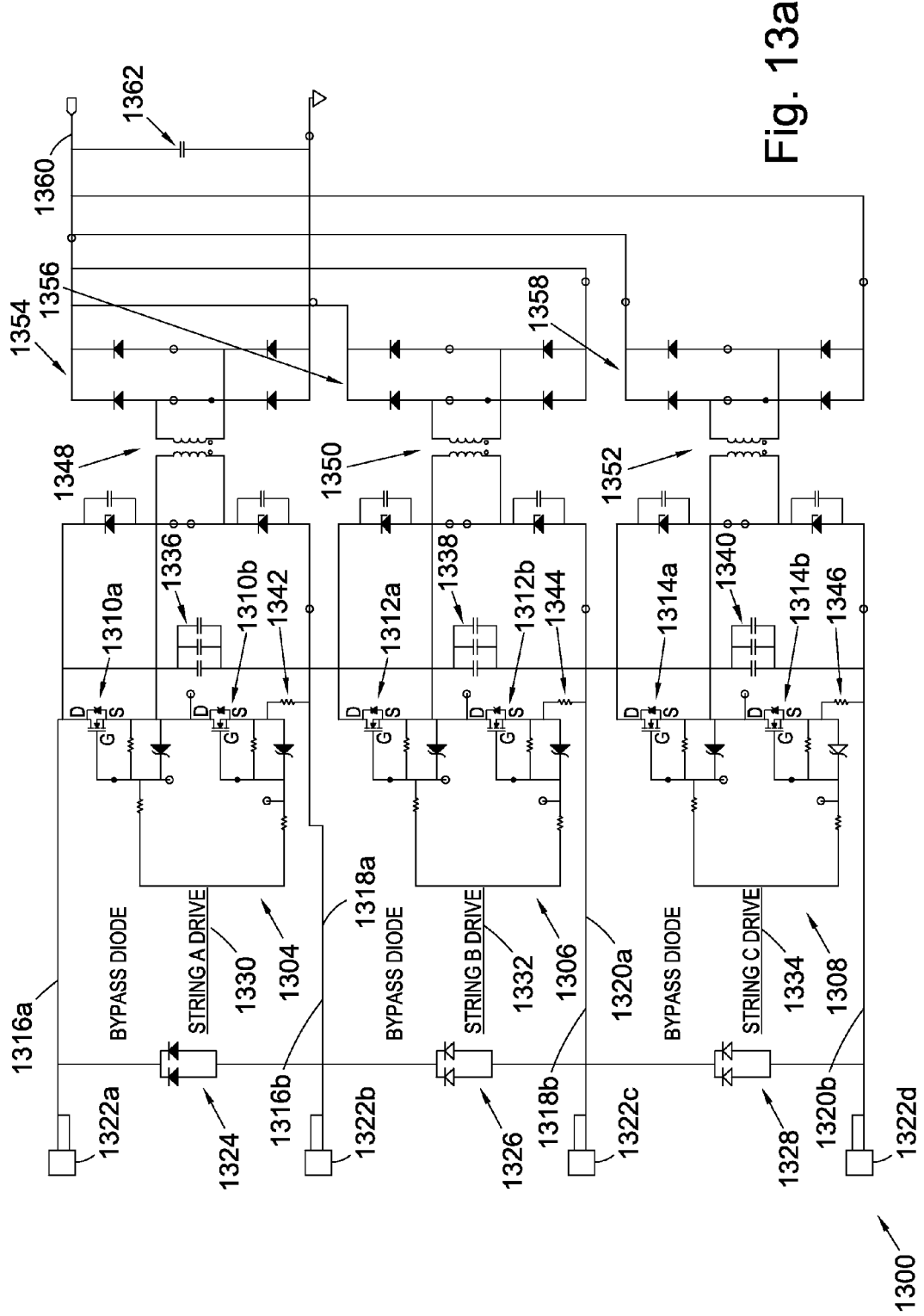

Referring now to FIG. 13a, this shows a first example circuit implementation 1300 of the input power conversion stage of a power conditioning unit according to an embodiment of the invention. The circuit comprises a set of input power convertors 1304, 1306, 1308 each comprising a respective pair of MOSFET switches 1310a, b; 1312a, b; 1314a, b connected across a respective pair of DC input connections 1316a, b; 1318a, b; 1320a, b. In the illustrated example DC input connections of the input power convertors for adjacent sub-strings are connected together to form a shared DC input connection for each tap on the string of solar cells of the PV panel. Thus DC input connections 1316b and 1318a, and 1318b and 1320a are connected together. Thus the input power conversion stage 1300 has four DC input connection points 1322a-d, connection points 1322a, d connecting to either end of the complete string of solar cells of the PV panel, and connection points 1322b, c connecting to taps on the string of solar cells defining, in this example three sub-strings of the complete string. In this example the DC input connections of the input power convertors are each provided with a respective bypass diode 1324, 1326, 1328 (each implemented as a pair of parallel-connected diodes), which may be mounted on the same circuit board as the power conditioning unit.

Each pair of MOSFETs has a respective gate drive control connection 1330, 1332, 1334 for PWM (Pulse Width Modulation) or resonant control of the input power conversion stage. (For simplicity the gate drive controllers are omitted from the figure). Each input power conversion stage also includes a small, non-electrolytic capacitor (implemented in this example as three parallel-connected capacitors) 1336, 1338, 1340, although the main energy storage in the power conversion unit is implemented on the high voltage DC link, as previously described. Each input power convertor also includes a current sensing resistor 1342, 1344, 1346 to sense a current provided by the respective sub-string to which the input power convertor is connected. The current supplied by a sub-string is sensed by sensing the voltage across these resistors.

Each input power convertor operates to convert the input DC power to AC which is provided to a respective transformer 1348, 1350, 1352 followed by an AC-to-DC convertor, as illustrated respective full bridge stages 1354, 1356, 1358. The outputs of each full bridge stage are connected in parallel to a common DC link bus 1360 provided with a parallel-connected energy storage capacitor 1362. This DC bus provides DC power to a subsequent common output power conversion stage (not shown in the figure) as previously described, to provide an AC mains output. A typical voltage from a PV panel is of order 30 volts and thus in this example, with three sub-strings, each sub-string generates of order 10 volts. In an example embodiment the DC link 1360 operates at around 320 volts and each transformer has a 1:32 turns ratio, where the primary may just be one or two turns.

Figure 13B:
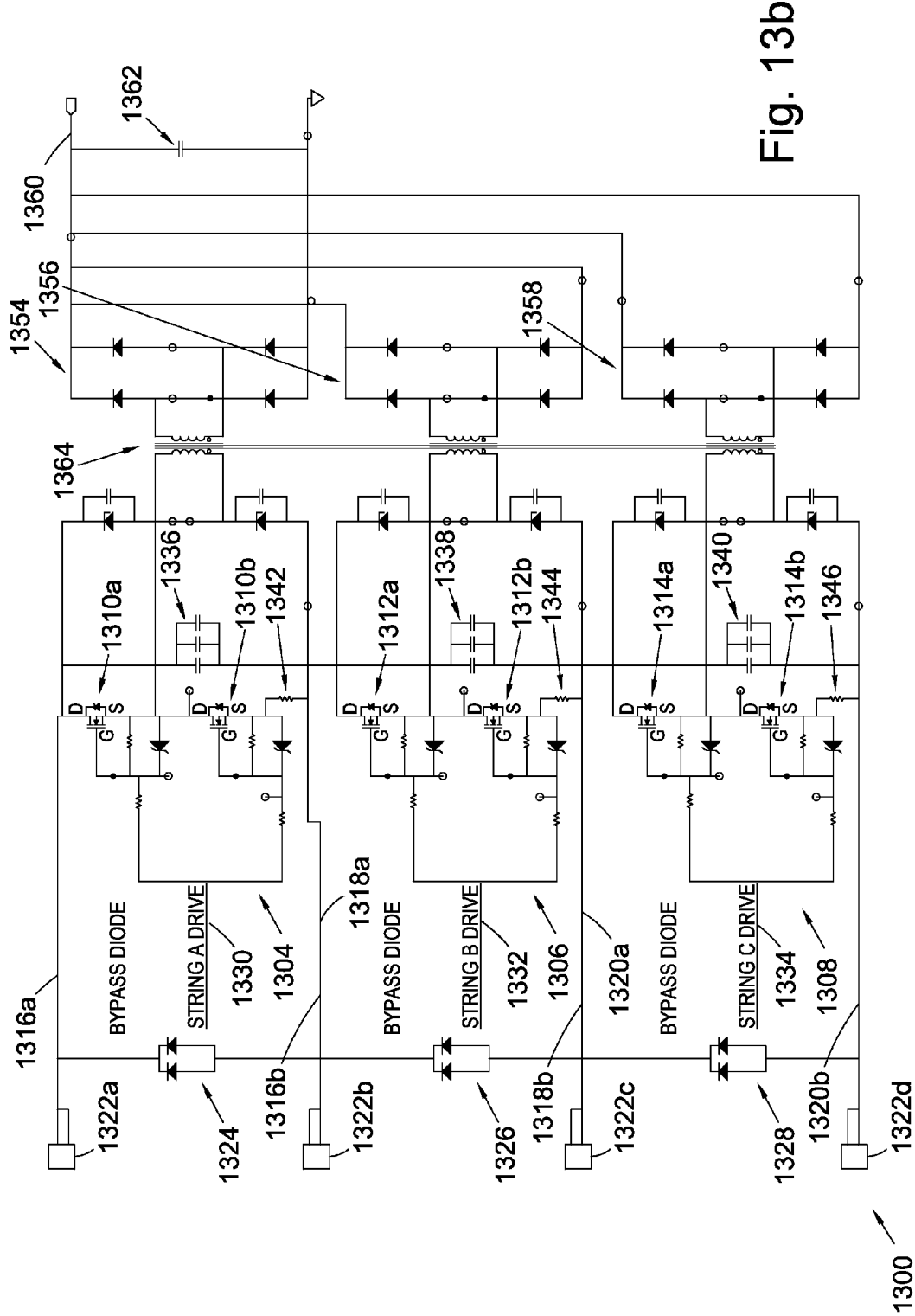
Figure 13C:
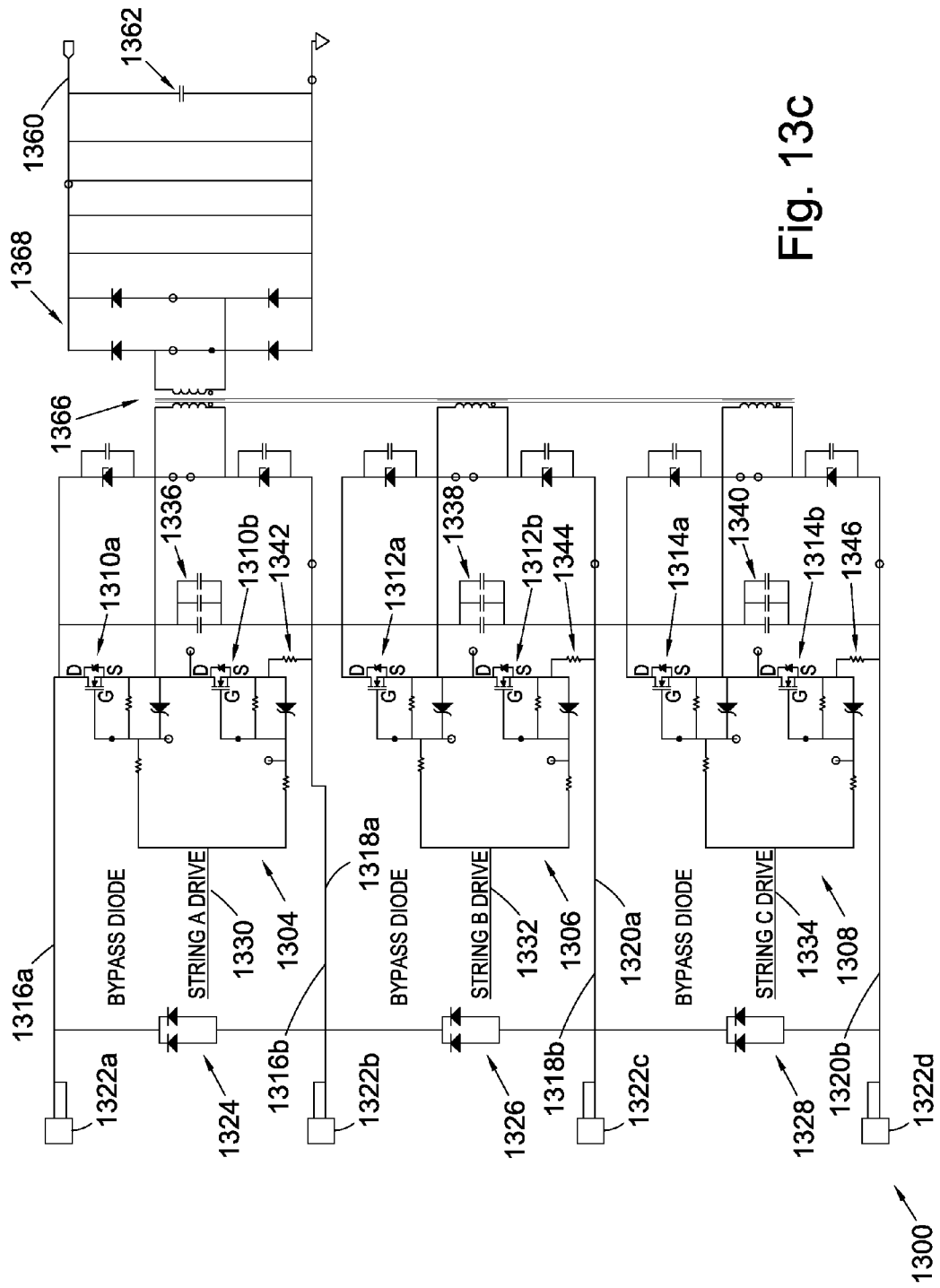

FIG. 13b illustrates a variant of the arrangement of FIG. 13a in which the separate transformers 1348, 1350, 1352 are replaced by a shared transformer 1364. FIG. 13c illustrates a further variant in which the shared transformer 1366 has a shared, common secondary winding providing power to a shared rectification stage 1368 coupled to DC link 1360. Preferably for these arrangements the switching of the MOSFETs in the input power convertors is synchronized to be 60° or 120° apart, to reduce the ripple on the DC link.

Figure 14:
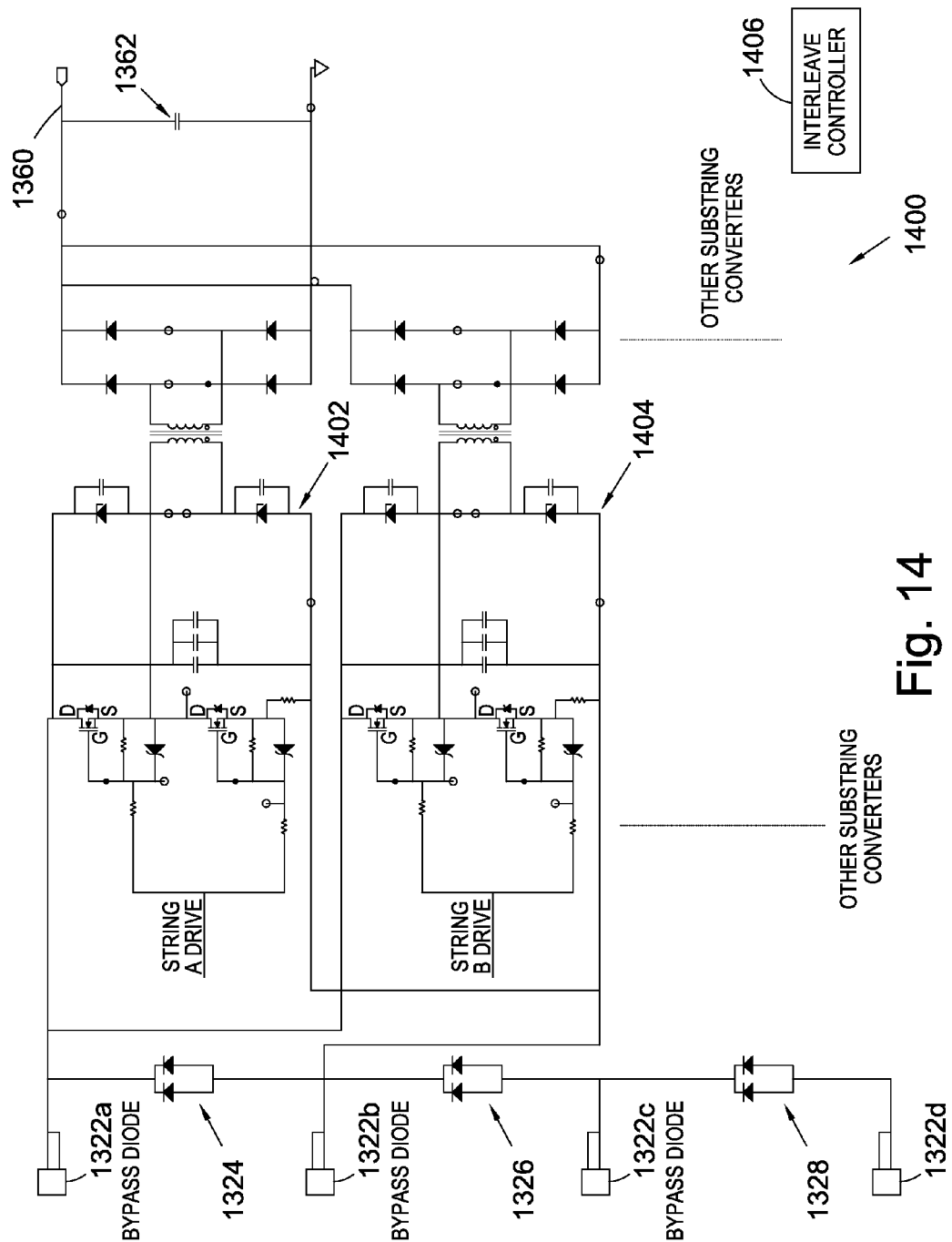
FIG. 14 shows a variant circuit architecture to the arrangements of FIG. 13 with an 'interleaved' topology.

Referring next to FIG. 14, this shows a variant circuit architecture 1400 to the arrangements of FIG. 13, illustrating that each of the set of input power convertors may be replaced by a pair of parallel-connected input power convertors 1402, 1404, to implement the above described interleaved topology. Embodiments of this architecture also include an interleave controller 1406 to control switching between running just one convertor of the pair and running both convertors, depending upon the power provided by a sub-string, in a similar manner to that previously described for a complete PV panel. In this way the number of power convertors used for each sub-string may be varied according to the power from the sub-string, running both convertors when more power is available and just one when less power is available, or alternatively running one of the convertors designed for higher power than the other when more power is available from the sub-string, and running the other convertor when less power is available.

FIG. 15 shows a further variant circuit architecture 1500 in which the DC-to-AC conversion stages 1502, 1504, 1506 of each input power convertor includes both a sub-string MPPT control function, and a bypass control function (in a similar manner to the architecture of FIG. 11a). The sub-string MPPT control function provides MPPT control of the input power conversion stage for a sub-string according to any of a range of techniques which will be familiar to the skilled person, but applying this to the sub-string rather than to the PV panel as a whole. The bypass control function operates to bypass a shaded sub-string responsive to detection of a reduction in voltage and/or current and/or power from the sub-string, for example by controlling both the switching MOSFETs in the input DC-to-DC conversion stage to switch on and short the respective pair of DC input connections. The architecture illustrated in FIG. 15 includes bypass diodes which may, for example be mounted on the solar panel, and may therefore be present even if not necessary. However we will also describe, later, arrangements in which these bypass diodes are omitted.

Figure 16A:
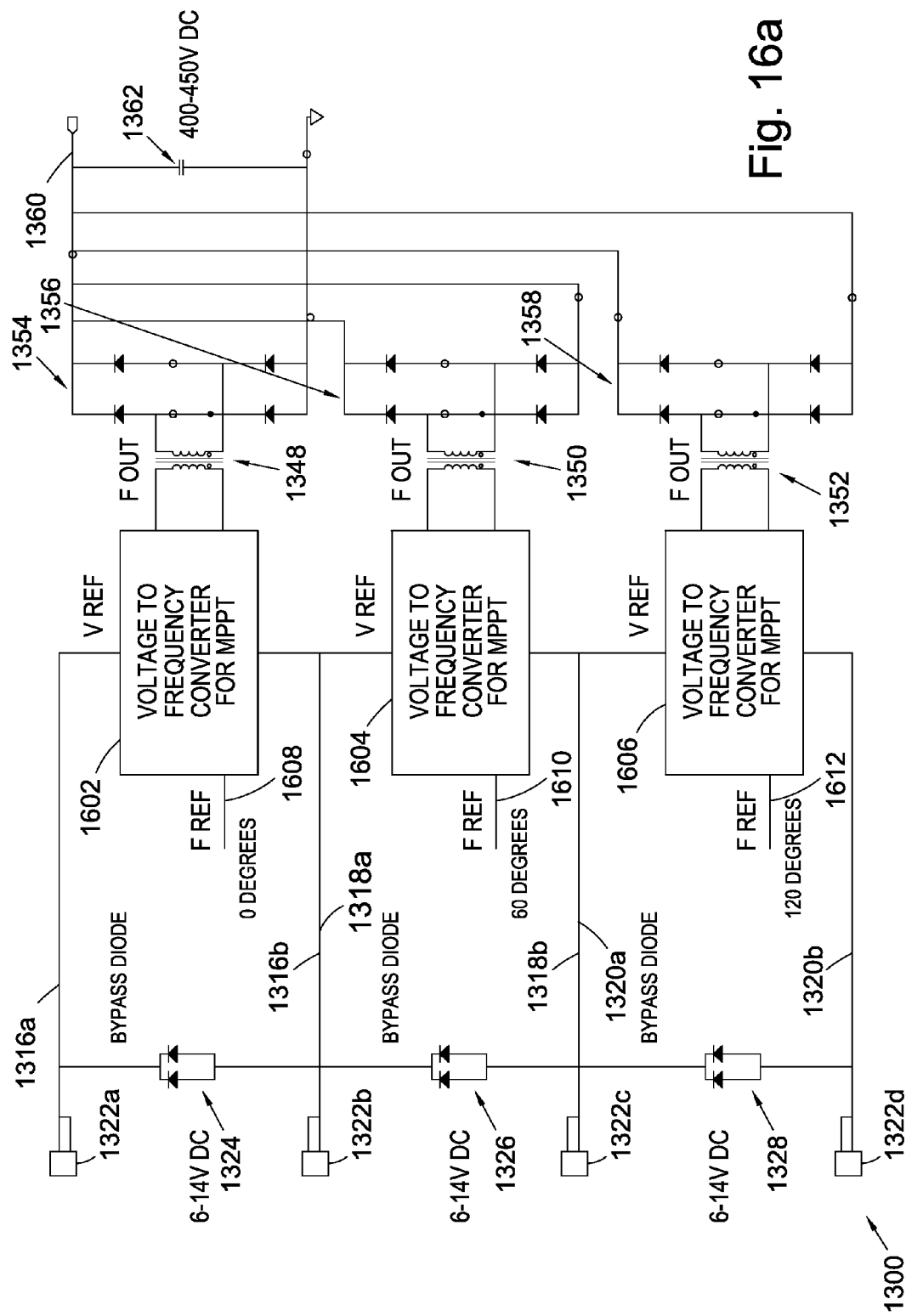
FIGS. 16a and 16b show circuit architectures employing voltage-frequency based sub-string MPPT/dc gain control.

FIG. 16a shows an implementation 1600 of a power conditioning unit in which the input power converter stages employ voltage-frequency based MPPT thus the dc-to-ac power conversion stages 1602, 1604, 1606 of the input power converters for the respective sub-strings in this example employ a common reference frequency signal input 1608, 1610, 1612 with the phases of the reference signals 60° apart (as previously described). The power transferred from the dc input to the dc link 1360 is dependent on the frequency of operation of stages 1602, 1604, 1606 which, effectively, adjusts the gain of the input power converters.

Figure 16B:
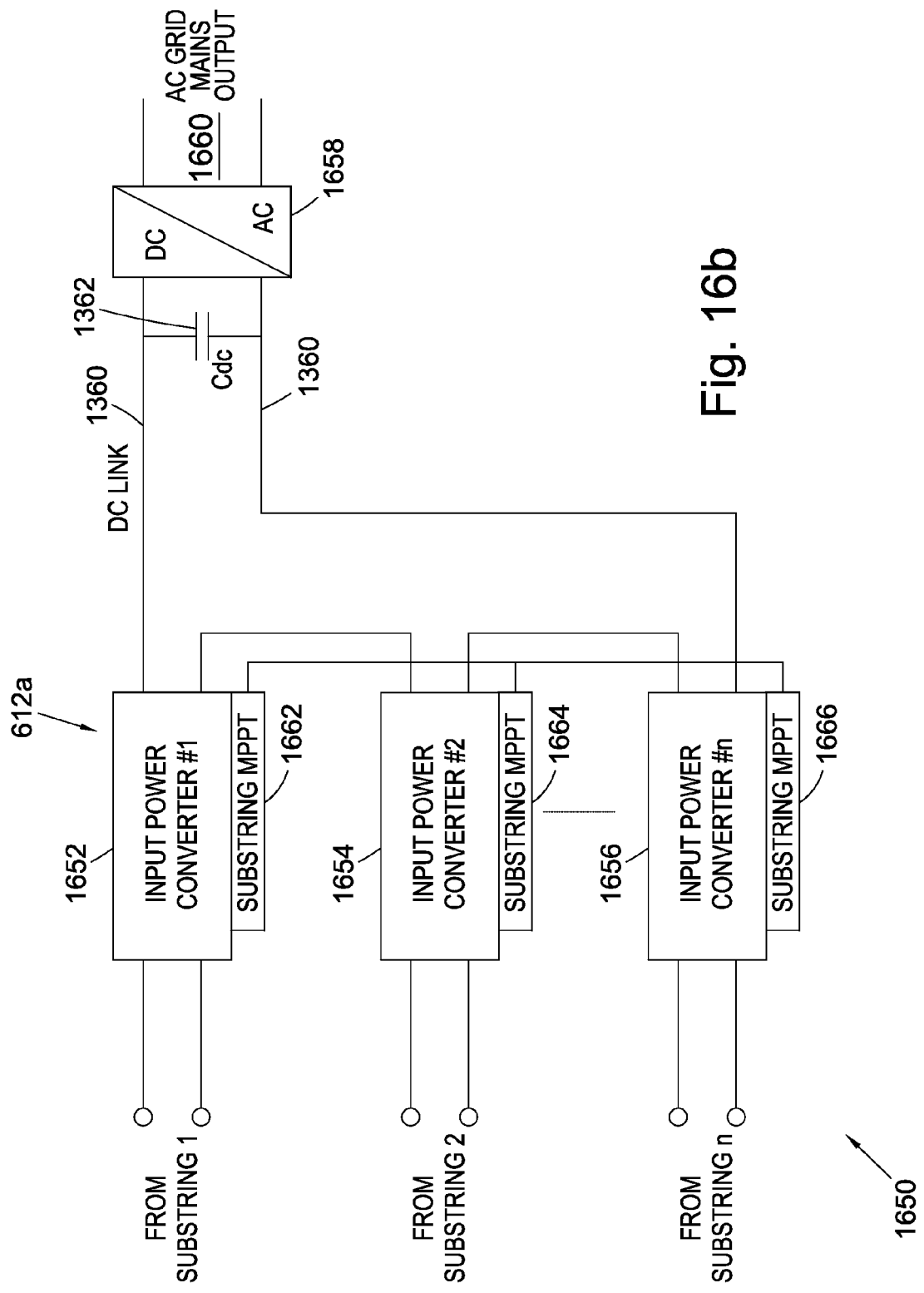

FIG. 16b illustrates a variant system architecture 1650 of the arrangement of FIG. 16a in which each of the input power converters 1652, 1654, 1656 provides a respective dc output, and in which these dc outputs are connected in series to provide dc power to dc link 1360, which in turn provides power to the common dc-to-ac output power conversion stage 1658 which provides ac grid mains output 1660. In the arrangement of FIG. 16b each input power converter includes a respective sub-string MPPT control function 1662, 1664, 1666 (in communication with one another). Thus sub-string MPPT function may include a dc gain adjust function so that if one sub-string is shaded and therefore the dc output voltage from the respective input power converter is reduced, the dc voltage gain of the other input power converters may be increased (without necessarily affecting the MPPT operating point) to compensate. In this way the voltage on dc link 1360 may be maintained above the peak ac mains output voltage, for example above around 170 volts or 340 volts (depending on the country), which is helpful for implementation of the particularly advantageous power conversion techniques we have previously described which do not use electrolytic capacitors for energy storage.

Figure 17:
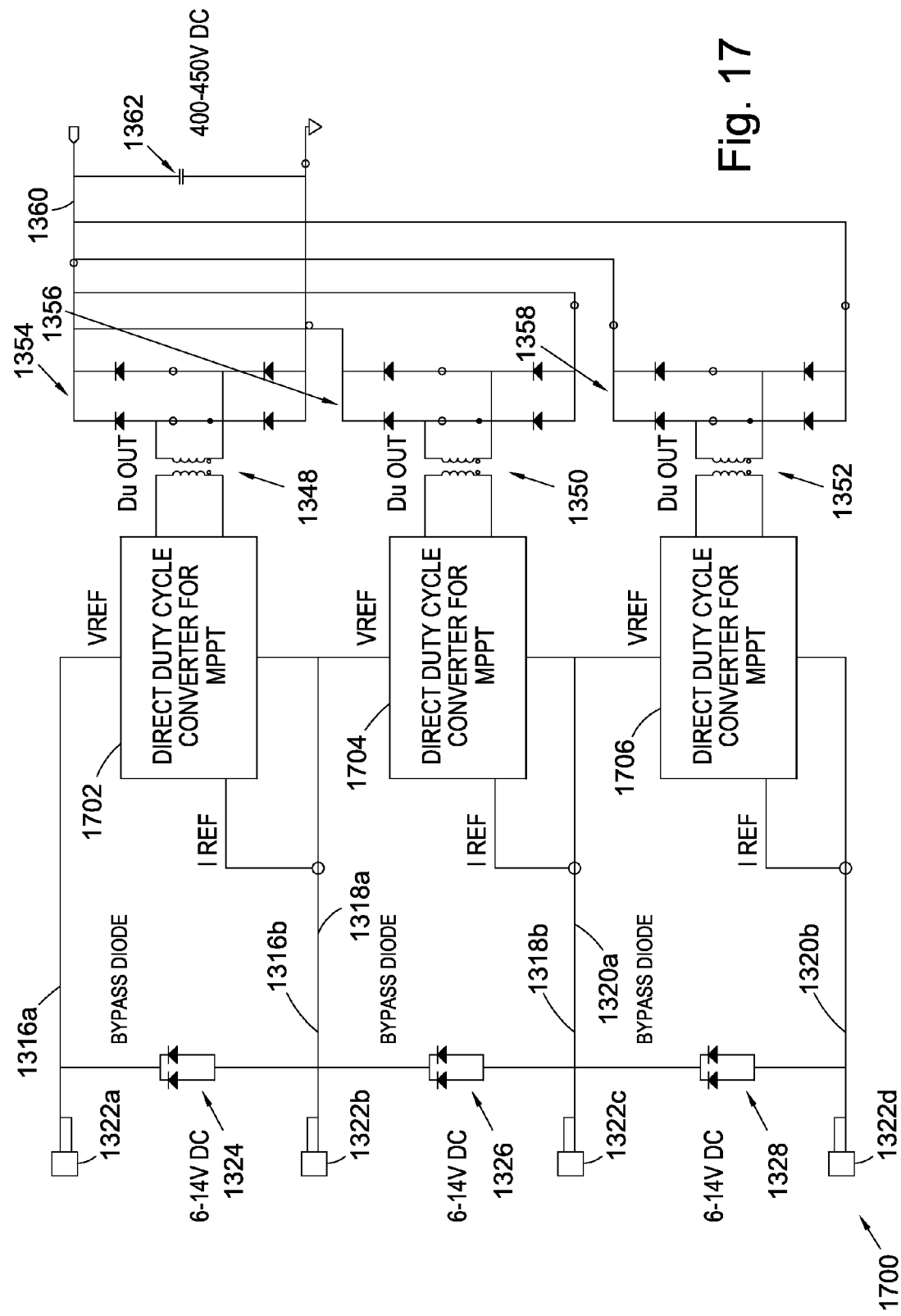
FIG. 17 shows a circuit architecture employing direct duty cycle sub-string MPPT control.

FIG. 17 shows a further variant power conditioning unit architecture 1700 in which the dc-to-dc conversion stages 1702, 1704, 1706 of the respective input power converters for the sub-strings, rather than using a resonant converter as illustrated in FIG. 16a, employ direct duty cycle control of the MOSFET switches to implement sub-strings MPPT. The direct duty cycle control comprise PWM control to control the power transfer through an input power converter, for example based on an input current reference sensing a sub-string current (for example using a current sensing resistor as previously described), and a voltage reference sensing a sub-string voltage, as schematically illustrated.

Figure 18A:
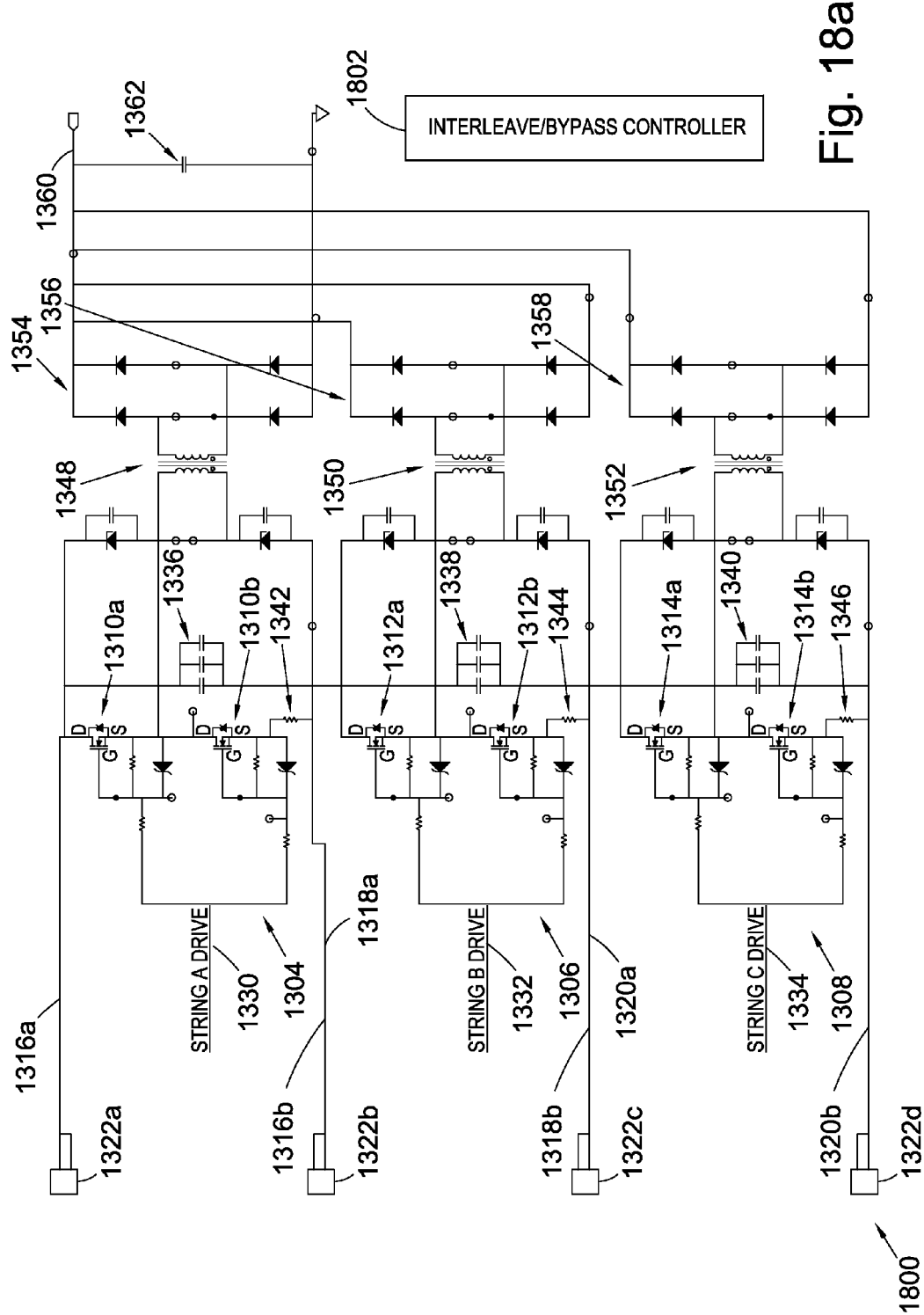
FIGS. 18a to 18c show example circuit architectures without bypass diodes, employing active bypass control.
Figure 18B:
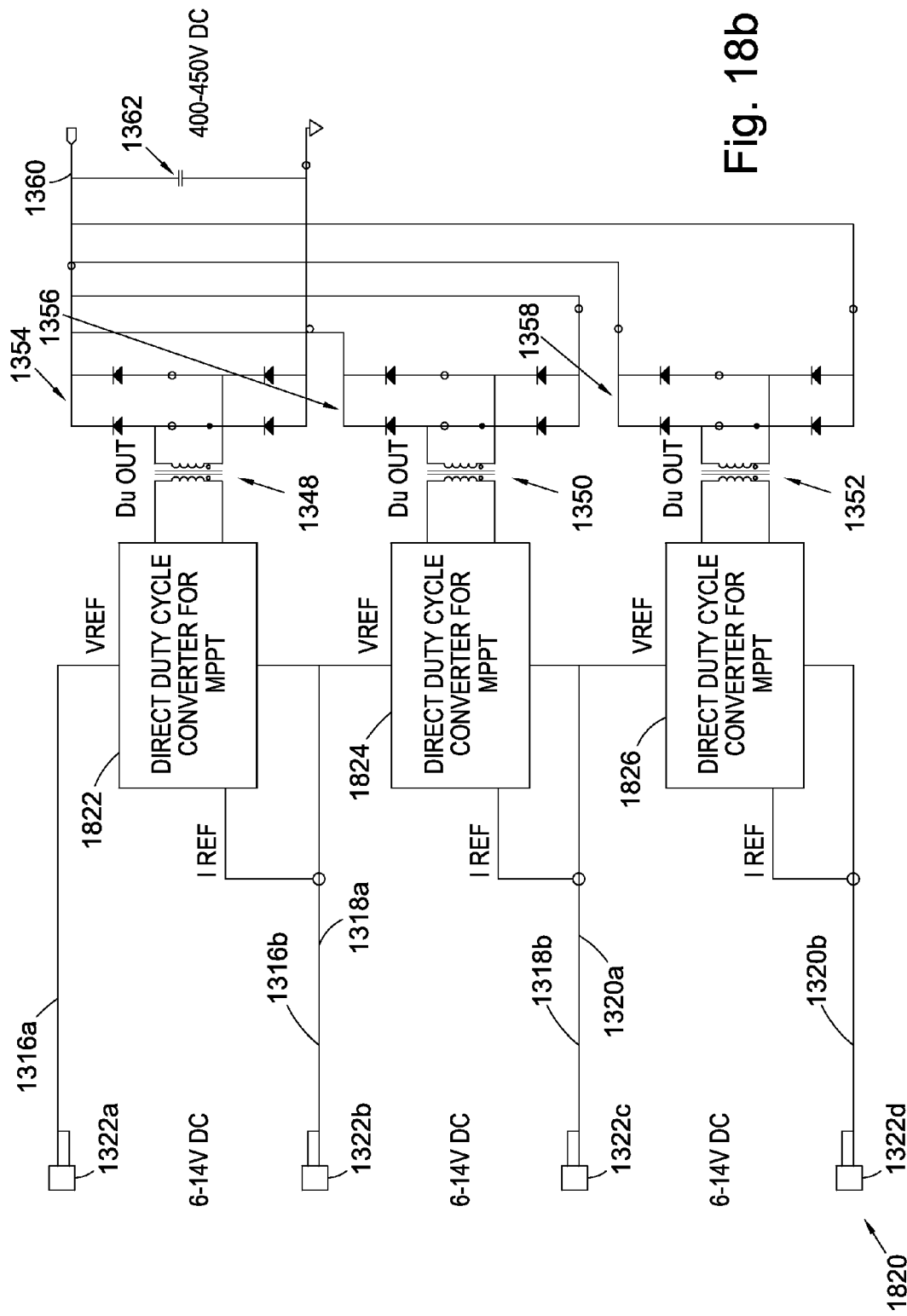

FIG. 18a illustrates a circuit architecture 1800 similar to that of FIG. 13a, but in which the bypass diodes are omitted. In this architecture an active bypass function is provided by an MPPT/bypass controller 1802, as previously described. FIG. 18b illustrates a variant system architecture 1820 to the arrangement of FIG. 18a, in which the input power conversion stages 1822, 1824, 1826 each include an active bypass control function as well as, optionally but preferably, MPPT, for example employing direct duty cycle control. The current and/or voltage produced by a sub-string may be sensed and when this is less than a threshold value (or when these define less than a threshold power) shading of a sub-string may be assumed and the bypass function controlled on. Alternatively shading may be detected by detecting a greater than threshold difference between the voltage and/or current and/or power from one sub-string and a voltage and/or current and/or power derived from one or more of the other sub-strings, for example an average power of all or the other sub-strings. Optionally the bypass control need not entirely switch off a sub-string and, for example, additionally or alternatively to employing MPPT control for the sub-string may operate or draw power from a sub-string cyclically, operating the sub-string periodically rather than continuously to avoid over-heating. The proportion of time for which a sub-string is operated in such a periodic manner may be dependent on the determined degree of shading so that the sub-string may be operated for a greater proportion of the time when it is only lightly shaded, the proportion of time for which it operates being decreased with increased shading.

Figure 18C:
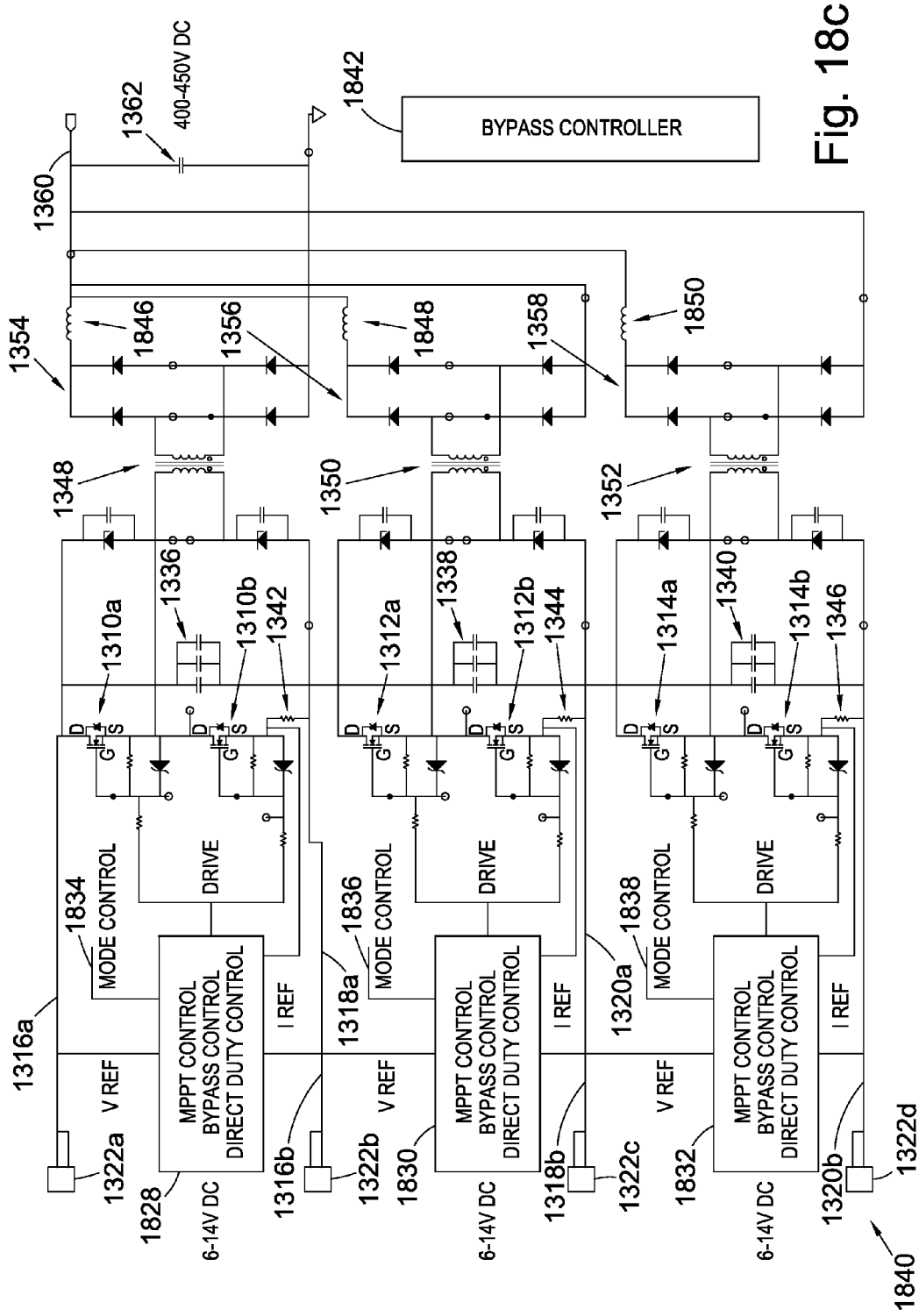

FIG. 18c illustrates a further variant circuit architecture 1840 of FIG. 18b, illustrating further circuit details, and the provision of MPPT control for each of power conversion stages 1822, 1824, 1826. The respective controllers 1828, 1830, 1832 for each sub-string (which may, in embodiments, be implemented on a common, shared microcontroller in software and/or hardware) each have a mode control input 1834, 1836, 1838, in embodiments implemented as a connection to the gate drive circuits of the respective MOSFETs. This control input may be employed by a separate bypass controller 1842 to control the gate drives to the MOSFETs of a sub-string to switch the MOSFETs on. Alternatively the bypass controller 1842 may be integrated with the controllers 1828, 1830, 1832. With either implementation, as previously described, broadly speaking the bypass control function enables the power conditioning unit to extract as much of the power as is available per sub-string, up to the point where the current source (of a sub-string—see FIG. 10) will reverse. At this point the sub-string is bypassed to in effect, re-circulate this energy. This provides substantially more control over part of the panel behaviour. As previously described, the bypass control function may be combined with MPPT control.

The circuit implementation of FIG. 18c also shows some further details of preferred implementations, in particular showing current sensing by voltage sensing across current sensing resistors 1342, 1344, 1346 for each separate sub-string, and output inductors 1846, 1848, 1850 for each of the respective input power converters. The output inductors, each connected in series between the dc output of an input power converter and the dc link 1360 provide proportional load sharing between the input power converters/sub-strings. This proportional load sharing may also be applied as a preferred feature in any of the previously described circuits/circuit architectures.

Figure 19A:
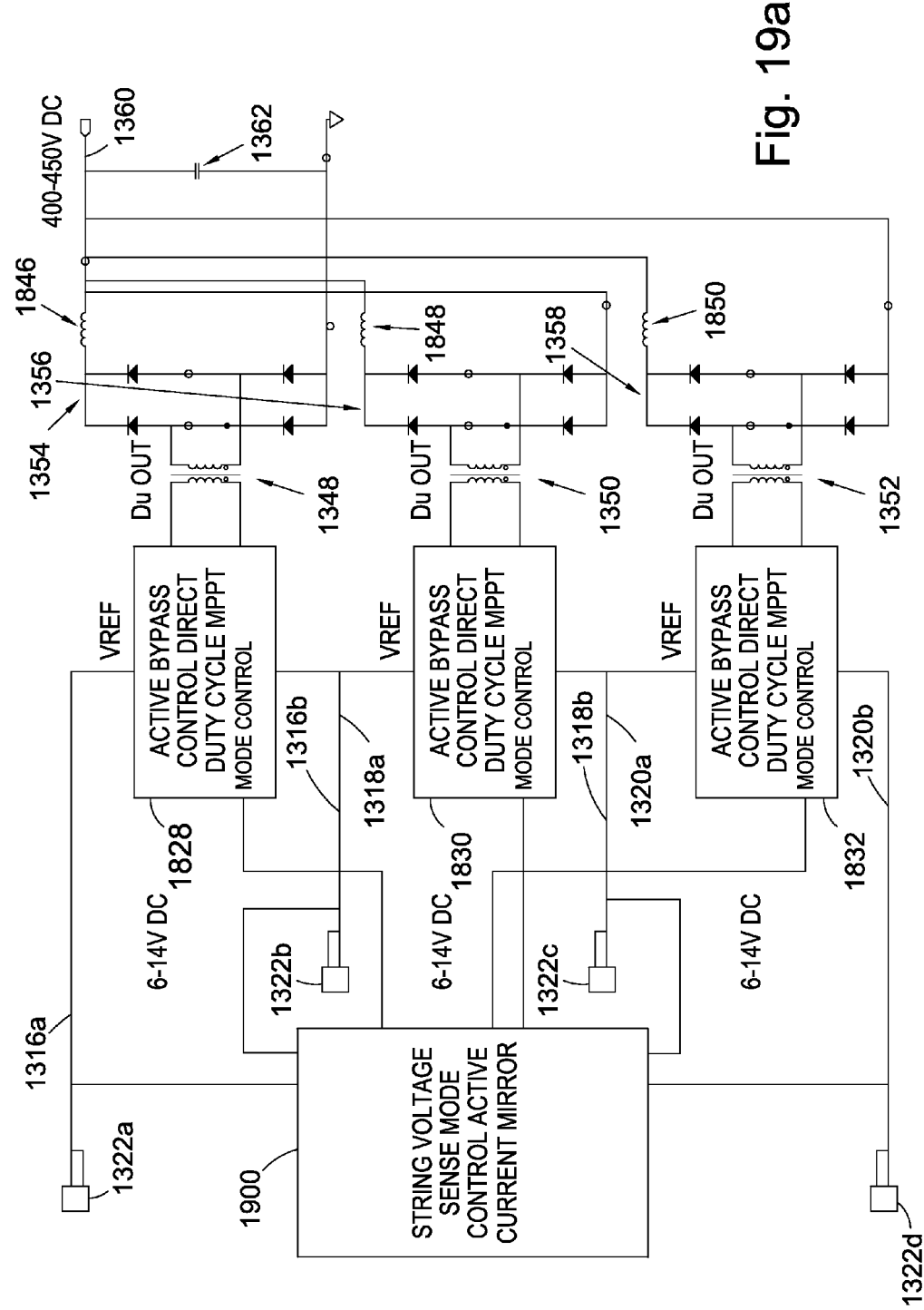
FIGS. 19a to 19c show, respectively, first and second sub-string sensing circuit architectures, and an embodiment of a sub-string sensing circuit.
Figure 19B:
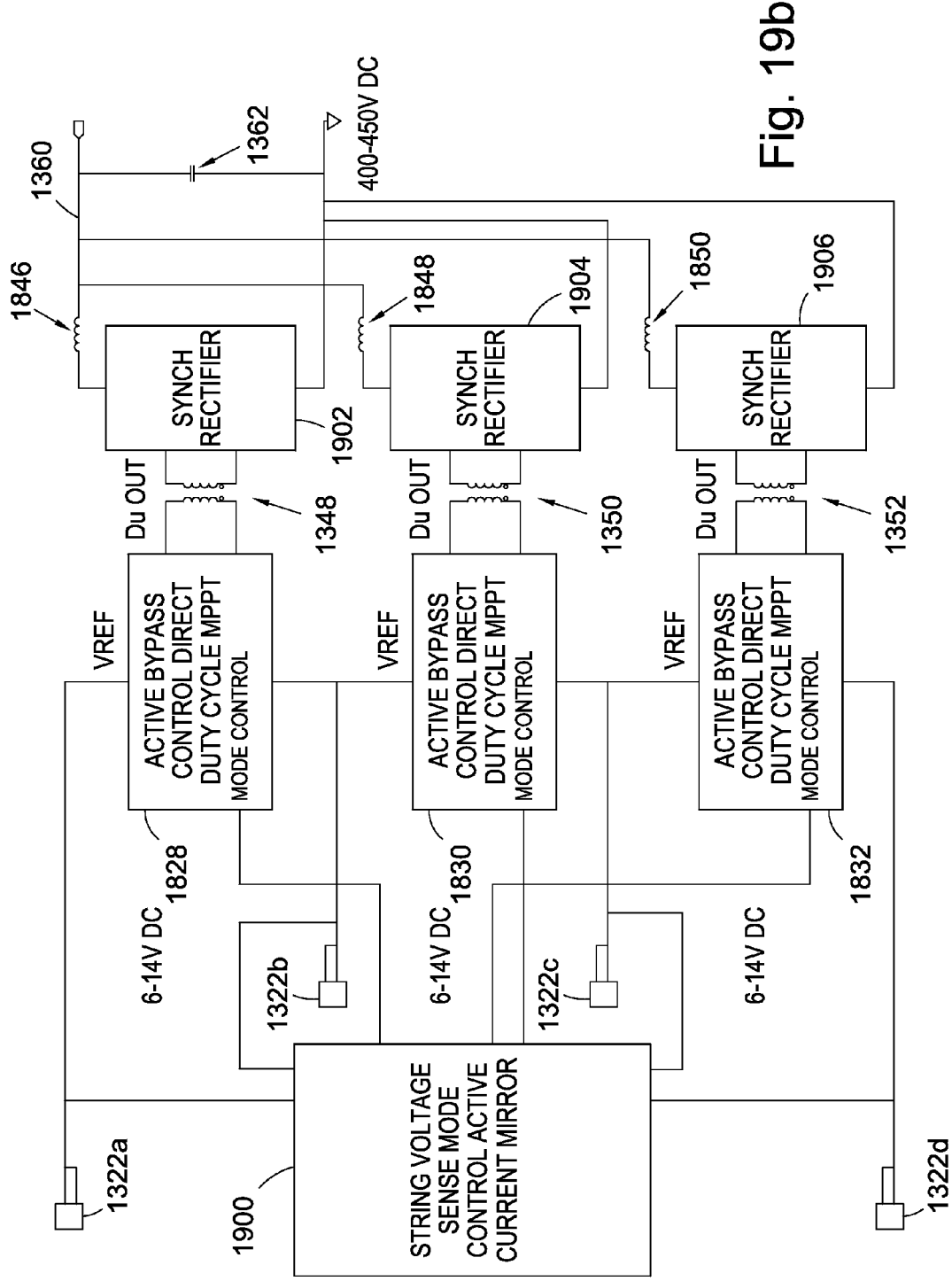
Figure 19C:
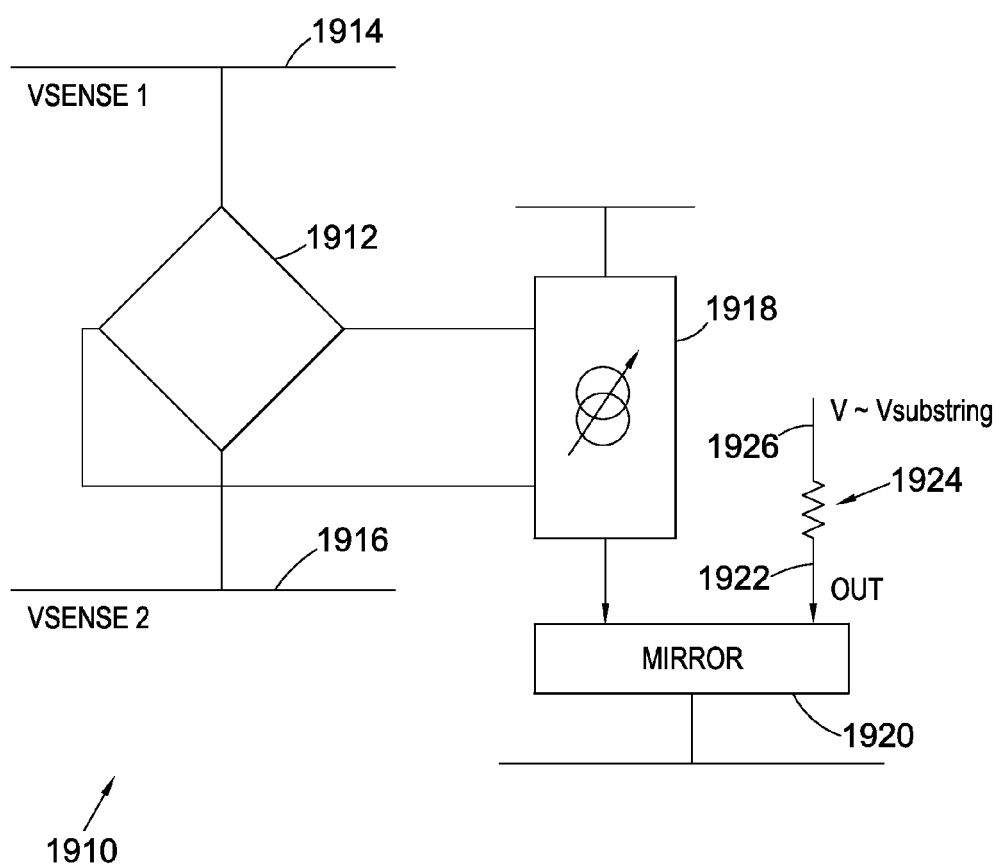

FIG. 19a shows a block diagram of a sensing arrangement for the architecture of FIG. 18, illustrating a module 1900 which provides voltage and current sensing for each sub-string, and which provides a mode control output for each sub-string to operate the bypass control when necessary. FIG. 19b illustrates a similar system in which the previously described full bridge output stages of the input converters are placed by respective synchronous rectification stages 1902, 1904, 1906, for reduced losses. Again these synchronous rectifiers may also be employed in any of the previously described embodiments. FIG. 19c shows a preferred embodiment of a sub-string voltage sensing circuit 1910, which may also be used for current sensing by sensing the voltage across a current sense resistor. The circuit shown is able to measure a 'floating' voltage and can also provide a significant voltage gain without the need for an operational amplifier. Thus the circuit comprises a full bridge rectifier 1912 coupled between first and second voltage sense lines 1914, 1916, which provides an output to a programmable current source 1918, for example comprising a transistor. This in turn provides a current input to a current mirror 1920 which provides a current output on line 1922 which is converted to a voltage by resistor 1924 to provide an output on line 1926, the output comprising a voltage proportional to the voltage across voltage sensing lines 1914, 1916. Current mirror 1920 provides gain in a circuit. Where necessary mirror 1920 may be provided with multiple mirrored current outputs.

Figure 20:
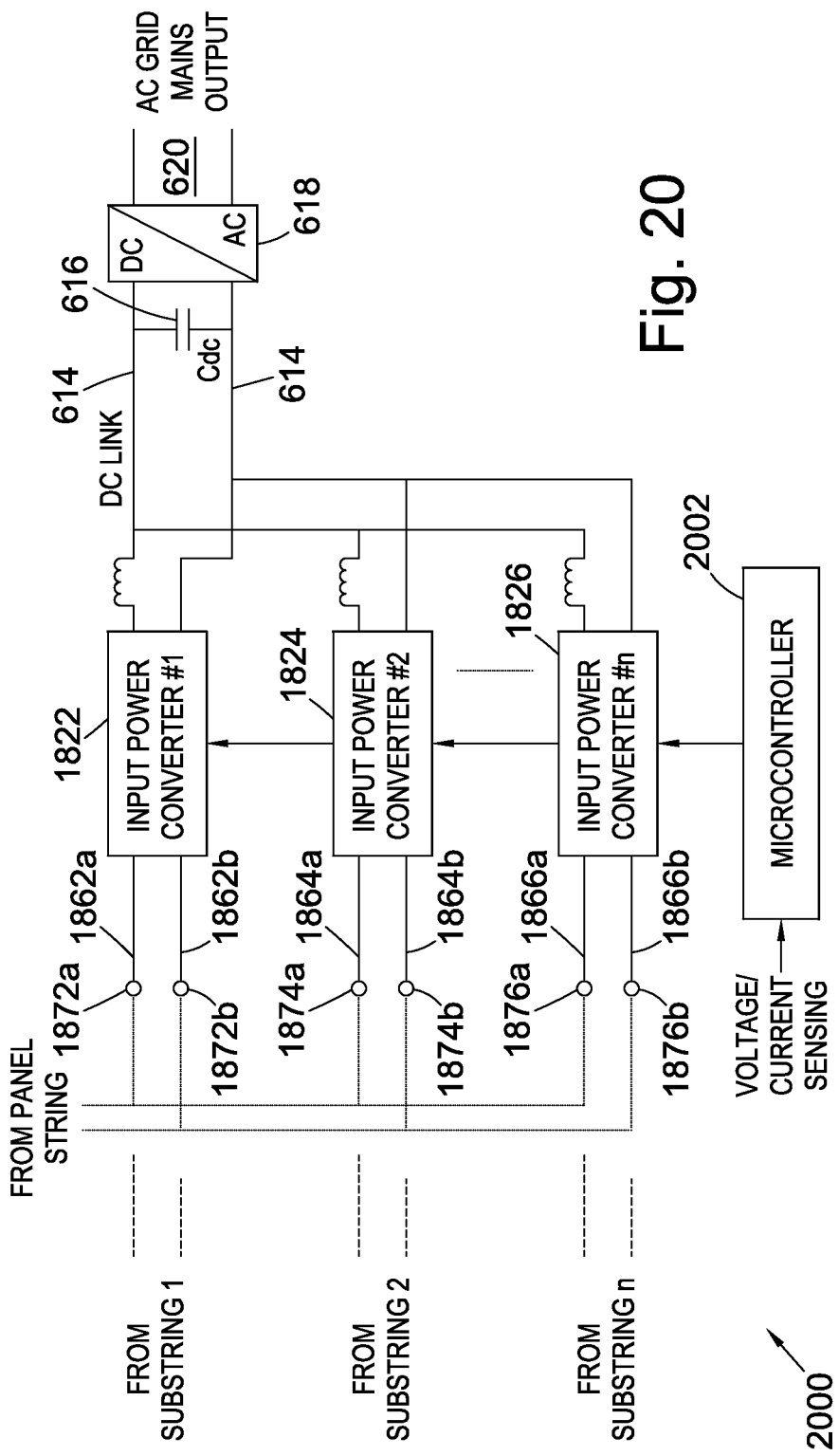
FIG. 20 shows a schematic block diagram of a multipurpose photovoltaic power conversion unit circuit board.

FIG. 20 shows a schematic block diagram of a multi purpose photovoltaic power conditioning unit circuit board 2000. The illustrated architecture is similar to that of FIG. 18 but the technique at FIG. 20 may be employed with the other architectures described. In the circuit board of FIG. 20 each input power converter 1822, 1824, 1826 is provided with a pair of dc input connections 1862a, b, 1864a, b, 1866a, b each with a respective termination 1872a, b, 1874a, b, 1876a, b. These may either be each connected to a respective sub-string as illustrated by the dashed lines, in the manner of FIG. 11a or FIG. 11b. Alternatively these may be connected in parallel to provide a common pair of dc input connectors for two or more input power converters which is then connected the complete PV panel, to provide a topology of the type illustrated in FIG. 4a. The controller 2002 controls each of the input power converters and comprises software or firmware to implement either the interleaved control strategy described above for a complete PV panel, switching input power converters in/out as needed, according to the power from the panel, or any necessary sub-string level control. In a simple embodiment no sub-string control is needed as, for example, MPPT control is provided by an MPPT control loop operating on the common output stage of the power conditioning unit. However microcontroller 2002 may optionally provide separate, sub-string MPPT control and/or bypass control. The operational mode of the circuit board may be selected, for example, by selecting a link on the circuit board and/or by writing a register value or modifying the firmware. The described arrangement is useful because a similar circuit board can be employed in multiple different operational modes depending merely on how the input connections are made, with a software/firmware set up for the desired application—either sub-string—power conversion or 'interleaved' power conversion.

Figure 21:
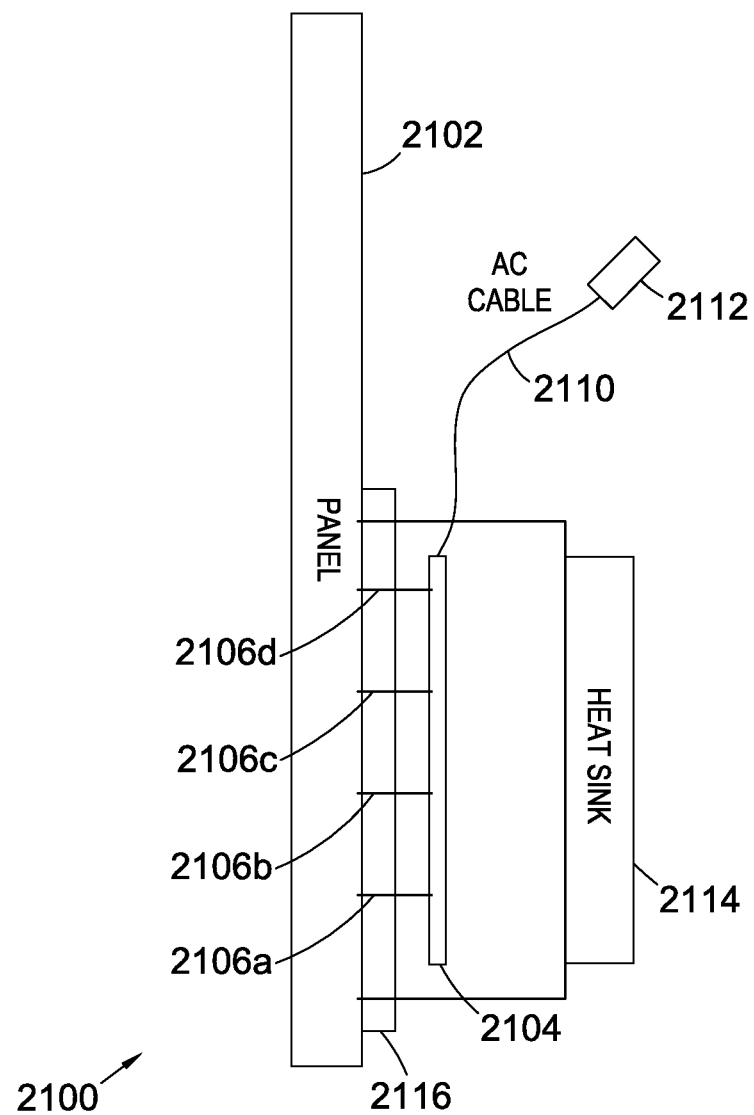
FIG. 21 shows a vertical cross section through an integrated photovoltaic panel and power conditioning unit.

FIG. 21 shows a photovoltaic panel system 2100 comprising a PV panel 2102 in combination with a power conditioning unit 2104, for example according to any of the previously described architectures. In the PV panel system of FIG. 21 the power conditioning unit 2104 is integrated with the panel in that a circuit board 2104 of the power conditioning unit is connected directly to each of a set of sub-string tabs 2106a-d defining sub-strings of the PV Panel. Furthermore the circuit boards 2104 include the bypass diodes or, more preferably, these may be omitted and an active bypass function provided the board 2104 may be mounted directly on the panel by means of the electrical connections to the substrings, for example by soldering the board directly to the tabs or by clipping onto the tabs (to ease thermal stresses). Preferably the power conditioning unit is enclosed within a sealed enclosure 2108, environmentally sealing the panel and power conditioning unit together. The combined panel and power conditioning unit may then directly provide an ac mains power supply output, for example via a lead 2110 and optional connector 2112. The PV panel system including the power conditioning unit preferably includes a heat sync 2114 on the enclosure 2108, preferably opposite the panel and in thermal contact (not shown) with the circuit board 2104. Preferably a region of thermal insulation/separation 2116 is included between the power conditioning unit circuit board 2104 and the PV panel itself 2102.

Continuing to refer to FIG. 21 and to integration of the power conversion unit and PV panel, these techniques enable a system where the only cable or cables from the panel carry the AC grid voltage/current and not the PV voltage/current. This is thus a fully integrated solution which, in embodiments, results in the elimination of the bypass diodes creating a true AC solar module. There is also no need for a solar junction box specifically for the tabs that emerge from the back of a solar module as the micro-inverter is soldered (for example by a wave solder process) or connected directly to these (for example, by one or more screw connectors). Thus the micro-inverter is effectively incorporated into the junction box and obviates the need for bypass diodes.

In summary, power harvest from photovoltaic power sources is subject to some real limitations of panel structure and behaviour. This is true for all PV technologies where cell variance and performance under shading lowers the overall harvest potential of the panel. The advent of DC optimizers and micro-Inverters allows for additional local monitoring and conversion, offering a higher level of control of panel performance and behaviour of the photovoltaic panels. The techniques we have described allow for a single MPPT algorithm sensed on the grid side of the converter. This MPPT technique is safe and simple and facilitates the sub-string converter approach we have described for both parallel and series connected PV sources. Some features and advantages of preferred embodiments and aspects of the invention (which may be provided in any combination) include:

1. Sub-string conversion in the range 6-12V D.C.
2. Interleaved operation with variable phase control over power range; lower ripple on the output stage; and three phase operation 60/120/180 phase operation of each stage.
3. Lower power conversion with lower current processing.
4. Lower voltages allowing low voltage MOSFETs to be used, for lower loss and higher reliability.
5. Individual or separate conversion stages.
6. Integration of a three phase magnetic structure, resulting in higher efficiency.
7. Novel voltage to frequency adjustment of dc transformer performance, on and off resonance with, potentially, 1.5 voltage amplification at lower power levels.
8. Conversion efficiency in the order of 98.5%-99%.
9. Active bypassing using an ideal bypass diode (an enhanced MOSFET), leading to higher reliability and lower loss.
10. Frequency control and/or direct duty cycle control of conversion stage.
11. Floating voltage sensing which can be referenced to PV +ve or −ve. This can be useful, inter alia, in +ve grounded PV systems.
12. Transformer driven synchronous rectification with an LLC converter, with low power operation using the body diode.

No doubt many other effective alternatives will occur to the skilled person. It will be understood that the invention is not limited to the described embodiments and encompasses modifications apparent to those skilled in the art lying within the scope of the claims appended hereto.

I claim:

1. A photovoltaic (PV) power conditioning unit for delivering power from a PV panel to an ac power supply output, the PV panel comprising a string of series-connected solar cells with at least one electrical tap connection on said string to define a set of series-connected sub-strings of said solar cells, the PV power conditioning unit comprising:

a plurality of input power converters, one for each said sub-string, each input power converter having a pair of dc input connections for connection to either end of a sub-string in the set of sub-strings, each of said input power converters having a power output, wherein each electrical tap connection on said string connects to a dc input connection of each of two power converters in the plurality of input power converters;

a sub-string sensing system comprising a voltage-programmed current source having a set of current programming inputs, each current programming input to receive a voltage signal from a sub-string in the set of sub-strings and having a corresponding programmed current output to output a programmed current dependent on a level of said voltage signal;

at least one input power converter controller coupled to said sub-string sensing system to control a level of power conversion of one or more input power converters responsive to a voltage from a particular sub-string received by the sub-string sensing system, wherein said programmed current output corresponding to the particular sub-string is coupled to a current-to-voltage converter to convert said programmed current to a voltage dependent on said programmed current for input to said input power converter controller;

a shared dc link to provide a common dc bus for said plurality of input power converters, wherein said power output of each said input power converter is coupled to said shared dc link to provide power from a sub-string in the set of sub-strings to said dc bus;

an energy storage capacitor, coupled to said shared dc link, to store power from said plurality of input power converters for delivering to said ac power supply output; and a common output power conversion stage coupled to said shared dc link to convert dc power from said shared dc link to ac power to provide an ac output from said PV power conditioning unit.

2. The photovoltaic power conditioning unit of claim 1, wherein each input power converter in the plurality of input power converters is a voltage-increasing dc-to-dc power converter.

3. The photovoltaic power conditioning unit of claim 2, wherein each input power converter in the plurality of input power converters comprises a dc-to-ac converter, wherein said dc-to-ac converters of said input power converters for said sub-strings are synchronized.

4. The photovoltaic power conditioning unit of claim 3, wherein said dc-to-ac converters drive a shared power coupling transformer, wherein said power output of an input power converter comprises a winding of said shared power coupling transformer, wherein each said input power converter is coupled to said shared dc link by a common output winding of said shared power coupling transformer.

5. The photovoltaic power conditioning unit of claim 4, wherein the common output winding of the shared power coupling transformer provides power to a shared rectification stage.

6. The photovoltaic power conditioning unit of claim 1 further comprising:
a sensor to sense one or both of a voltage on a sub-string and a current provided by said sub-string; and
a bypass controller coupled to said sensor to detect shading of said sub-string and, responsive to said detection, to control an input power converter connected to said shaded sub-string to reduce or stop power conversion by said input power converter from said shaded sub-string.

7. The photovoltaic power conditioning unit of claim 6, wherein said input power converter connected to said sub-string comprises a dc-to-ac converter comprising a set of switches, wherein said bypass controller is configured to control said switches to switch on, responsive to detection of said shading, to provide a bypass current path for said shaded sub-string through the input power converter for the shaded sub-string.

8. The photovoltaic power conditioning unit of claim 6, wherein said power outputs of said input power converters are connected in series, wherein said bypass controller is configured to increase a voltage gain of one or more unshaded said input power converters to compensate for said reduced or stopped power conversion from said shaded sub-string.

9. The photovoltaic power conditioning unit of claim 1 further comprising an output power converter maximum power point tracking (MPPT) control system, wherein said output power converter MPPT control system is configured to control said common output power conversion stage to maximise maximize said dc power drawn from said shared dc link.

10. The photovoltaic power conditioning unit of claim 1, wherein each of said input power converters has a respective associated sub-string maximum power point tracking (MPPT) controller to provide separate MPPT control for each sub-string of said PV panel.

11. The photovoltaic power conditioning unit of claim 10 further comprising:
a sensor to sense one or both of a voltage on a sub-string and a current provided by said sub-string; and
a bypass controller coupled to said sensor to detect shading of said sub-string and, responsive to said detection, to control an input power converter connected to said shaded sub-string to reduce or stop power conversion by said input power converter from said shaded sub-string, wherein a sub-string MPPT controller of said sub-string includes said bypass controller.

12. The photovoltaic power conditioning unit of claim 1, wherein each said input power converter comprises:
a set of power converters having respective inputs and outputs connected in parallel; and
a power level controller to selectively enable operation of power converters of said set of power converters responsive to a detected level of power being drawn from a corresponding sub-string to which the set of power converters is connected.

13. The photovoltaic power conditioning unit of claim 1, wherein the power outputs of the input power converters are connected in parallel to the shared dc link.

14. A photovoltaic (PV) power conditioning unit for delivering power from a PV panel to an ac power supply output, the PV panel comprising a string of series-connected solar cells with at least one electrical tap connection on said string to define a set of series-connected sub-strings of said solar cells, the power conditioning unit comprising:
a set of input power converters, one for each said sub-string, each input power converter having a pair of dc input connections for connection to either end of each of two sub-strings, each of said input power converters having a power output;
a shared dc link to provide a common dc bus for said set of input power converters, wherein said power output of each said input power converters is coupled to said shared dc link to provide power from a sub-string in the set of sub-strings to said dc bus, wherein each input power converter comprises a dc-to-ac converter, wherein said dc-to-ac converters of said input power converters for said sub-strings are synchronized such that each operates at a successive relative phase offset of (180°/n) or (360°/n) to reduce a voltage ripple on said dc link, wherein n is a number of the input power converters;
an energy storage capacitor, coupled to said shared dc link, to store power from said PV panel for delivering to said ac power supply output; and
a common output power conversion stage coupled to said shared dc link to convert dc power from said shared dc link to ac power to provide an ac output from said PV power conditioning unit.

15. A photovoltaic (PV) power conditioning unit for delivering power from a PV panel to an ac power supply output, the PV panel comprising a string of series-connected solar cells with at least one electrical tap connection on said string to define a set of series-connected sub-strings of said solar cells, the power conditioning unit comprising:
a sensing circuit to sense a voltage or current from one or more of said solar cells, said sensing circuit comprising:
a sense input to receive a voltage signal from said one or more solar cells dependent on said sensed voltage or current; and
a voltage-programmed current source having a current programming input coupled to said sense input, and having a programmed current output to output a programmed current dependent on a level of said voltage signal, wherein said programmed current output is coupled to a current-to-voltage converter to convert said programmed current to a voltage output from the sensing circuit dependent on said programmed current.

16. The photovoltaic power conditioning unit of claim 15, wherein said sense input is coupled to said current programming input of said voltage-programmed current source via a full-wave rectification circuit.

17. The photovoltaic power conditioning unit of claim 15 further comprising a current minor coupled between said programmed current output of said voltage-programmed current source and said current-to-voltage converter.

* * * * *